(12) United States Patent
Cho et al.

(10) Patent No.: US 7,801,580 B2
(45) Date of Patent: Sep. 21, 2010

(54) PORTABLE ELECTRONIC DEVICE

(75) Inventors: Sung-Chul Cho, Seoul (KR); Soo-Ik Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 12/144,088

(22) Filed: Jun. 23, 2008

(65) Prior Publication Data

US 2009/0027837 A1  Jan. 29, 2009

(30) Foreign Application Priority Data

Jun. 22, 2007 (KR) ............... 10-2007-0061550
Dec. 12, 2007 (KR) ............... 10-2007-0129062

(51) Int. Cl.
*H04M 1/00* (2006.01)
*H05K 5/00* (2006.01)

(52) U.S. Cl. .............. 455/575.4; 361/679.01

(58) Field of Classification Search .......... 361/679.55, 361/697.57, 679.01; 455/575.14, 575.4
See application file for complete search history.

(56) References Cited

U.S. PATENT DOCUMENTS

| 7,107,018 B2 * | 9/2006 | Jellicoe ............. 455/90.3 |
| D563,936 S * | 3/2008 | Kim et al. .......... D14/138 AD |
| 7,564,967 B2 * | 7/2009 | Pan ................... 379/433.12 |
| 7,656,662 B2 * | 2/2010 | Chen ................. 361/679.55 |
| 2005/0255897 A1 * | 11/2005 | Lee et al. ............ 455/575.4 |
| 2006/0046796 A1 * | 3/2006 | Park et al. ........... 455/575.4 |
| 2007/0080950 A1 * | 4/2007 | Lee et al. ............ 345/169 |
| 2007/0107922 A1 * | 5/2007 | Park et al. ............ 174/50 |
| 2007/0142101 A1 * | 6/2007 | Seshagiri et al. ..... 455/575.4 |
| 2007/0153452 A1 * | 7/2007 | Harmon et al. ....... 361/679 |
| 2007/0293286 A1 * | 12/2007 | Park et al. ........... 455/575.1 |
| 2008/0051161 A1 * | 2/2008 | Tashiro .............. 455/575.1 |
| 2008/0207272 A1 * | 8/2008 | Thornton et al. ...... 455/566 |
| 2008/0234014 A1 * | 9/2008 | Kim et al. ............ 455/575.4 |

FOREIGN PATENT DOCUMENTS

| EP | 1631043 A1 * | 3/2006 |
| EP | 1775596 A2 * | 4/2007 |
| EP | 1786181 A2 * | 5/2007 |

* cited by examiner

*Primary Examiner*—Lisa Lea-Edmonds
(74) *Attorney, Agent, or Firm*—Jefferson IP Law, LLP

(57) ABSTRACT

A portable electronic device having a sliding housing and adapted to slide in multiple directions so that it can be used as a key input device is provided. The portable electronic device includes a main housing, a sliding housing coupled to the main housing while being able to slide in upward, downward, leftward, and rightward directions on the main housing and at least one motion sensor for sensing a movement of the sliding housing in each direction, for creating a corresponding signal, and for applying the signal to a controller inside the main housing. The sliding housing provides a user input so that additional keys are not required and the overall size of the device can be reduced.

27 Claims, 40 Drawing Sheets

PORTABLE ELECTRONIC DEVICE

PRIORITY

This application claims the benefit under 35 U.S.C. §119 (a) of a Korean patent application filed with the Korean Intellectual Property Office on Jun. 22, 2007 and assigned Serial No. 2007-61550 and of a Korean patent application filed with the Korean Intellectual Property Office on Dec. 12, 2007 and assigned Serial No. 2007-129062, the entire disclosures of both of which are hereby incorporated by reference.

BACKGROUND OF THE INVENTION

1. Field of the Invention

The present invention relates to a portable electronic device including a cellular phone, a Personal Digital Assistant (PDA), a Hand Held Phone (HHP), and a communication device. More particularly, the present invention relates to a portable electronic device having a sliding housing adapted to slide in multiple directions so that it incorporates a key input function.

2. Description of the Related Art

Generally, the term "portable terminal" refers to a device used to provide wireless communication between users or between users and service providers via mobile communication base stations, for example. Various types of service content, including voice communication, short message transmissions, mobile banking, TV viewing, online games, and Videos on Demand (VODs), are provided to users via a portable terminal.

Furthermore, the term "terminal" commonly refers to a video player, a camera, a portable electronic device, a Personal Computer (PC), or a Portable DVD Player (PDP). Conventional portable electronic devices include HHPs, CT-2 cellular phones, digital phones, Personal Communication Service (PCS) phones, and Personal Data Assistants (PDAs).

Portable terminals are classified into bar-type terminals, flip-type terminals, and folder-type terminals according to their appearance. Bar-type terminals have a single bar-shaped housing. Flip-type terminals have a bar-shaped housing and a flip or a cover rotatably connected to the housing by a hinge device. Folder-type terminals have a single bar-shaped housing and a folder rotatably connected to the housing by a hinge device to be folded/unfolded. Conventional portable terminals, as mentioned above, are necessarily equipped with an antenna device, a data input/output device, and a data transmission/reception device. Key buttons are commonly used as the data input device so that data can be input based on finger pressing operations. A touch pad or a touch screen may also be used.

Portable electronic devices also incorporate a function for sending/receiving text messages by using key buttons.

Key buttons for data input basically include a number of key arrays. Particularly, the key buttons include a SEND key for initiating communication, a CANCEL key, a CLEAR key, numeric keys, character keys, an END key, function keys, and a POWER key.

In addition, the key buttons include a keypad, direction keys, and navigation keys on the front surface of the terminal, as well as a number of side keys acting as auxiliary function keys of the key pads.

The key input device for portable electronic devices also includes navigation keys for movement in the upward, downward, leftward, and rightward directions. By using the appropriate navigation key, the direction of movement of the activated cursor by the user can be determined and the cursor moved in that direction.

However, conventional navigation keys have a problem in that they include at least four keys to implement the necessary operations. Requiring four keys makes it difficult to render portable electronic devices compact.

Furthermore, even if realized, as the portable devices are reduced in size, the direction keys become very small. Such a small size makes it difficult to operate the keys correctly, thus causing an inconvenience for the user. The small size in addition to the fact that at least four keys must be provided only worsens the problem.

SUMMARY OF THE INVENTION

An aspect of the present invention is to address the above-mentioned problems and/or disadvantages and to provide at least the advantages described below. Accordingly, it is an aspect of the present invention to provide a portable electronic device having a sliding housing adapted to slide in multiple directions to be used as a key input device. With such a device, the sliding housing may be used to provide input instead of direction keys, navigation keys and the like. Accordingly, the sliding housing may be conveniently used to input characters and numbers, enjoy games, change the volume or channel, and navigate through a user screen. Furthermore, because the sliding housing may be used as an input, a large display unit may be installed rather than direction, navigation keys and/or other keys which are no longer necessary.

It is another aspect of the present invention to provide a portable electronic device having a sliding housing equipped with a display unit and adapted to slide in multiple directions to be used as a key input device so that, since direction and navigation keys are unnecessary, the terminal can be made compact and slim.

In accordance with an aspect of the present invention, a portable electronic device is provided. The portable electronic device includes a main housing, a sliding housing coupled to the main housing while being able to slide in upward, downward, leftward, and rightward directions on the main housing and at least one motion sensor positioned on the main housing to sense a movement of the sliding housing, create a corresponding signal, and apply the signal to a controller.

In accordance with another aspect of the present invention, a portable electronic device is provided. The portable electronic device includes a main housing, a sliding housing coupled to the main housing while being able to slide in upward, downward, leftward, and rightward directions on the main housing, at least one motion sensor positioned on the main housing to sense a movement of the sliding housing, create a corresponding signal, and apply the signal to a controller, a base member, first and second sliding members stacked on the base member to slide the sliding housing away from the main housing in each direction, a guide member mounted between respective members to guide the sliding housing so as to slide away from the main housing in the downward or leftward/rightward direction and at least one first and second elastic members positioned between respective members to provide an elastic force necessary to slide the first and second sliding members.

In accordance with another aspect of the present invention, a portable electronic device is provided. The portable electronic device includes a main housing, a sliding housing coupled to the main housing while being able to slide in upward, downward, leftward, and rightward directions on the main housing, at least one motion sensor positioned on the main housing to sense a movement of the sliding housing, create a corresponding signal, and apply the signal to a controller, a base member, first and second sliding members stacked on the base member to slide the sliding housing away from the main housing in each direction, a link member rotatably coupled between respective members so that, when the link member rotates about a link shaft, the sliding housing slides in the leftward/rightward direction and at least one first, second, and third elastic members positioned between respective members to provide elastic force necessary to slide the first and second sliding members.

According to one aspect of the present invention, the base member is coupled to the main housing, the base member has at least one guide protrusion formed on each of both ends to be coupled to a guide hole formed on the second sliding member, the guide protrusion supporting and guiding the second sliding member to slide in each direction, and the base member has an elastic fastener fastened to a first end of the second elastic member.

According to another aspect of the present invention, the second sliding member includes at least one guide hole formed on the second sliding member and coupled to the guide protrusion formed on the base member while being able to make a guide movement, guide units formed on both lateral surfaces of the second sliding member, respectively, to guide the first sliding member fastened to the sliding housing so that the first sliding member can slide away from the main housing in the upward direction, a rotation unit formed inside the second sliding member and rotatably coupled to the link shaft of the link member, a rotation guide unit formed adjacent to the rotation unit and coupled to the link member to guide rotation of the link member, at least one guide member formed on a lower surface of the second sliding member and adapted to make a guide movement along a guide movement hole formed on the base member when the first and second sliding members are slid so that the first and second sliding members can slide in the downward direction and leftward/rightward direction and at least one elastic fastener formed on the second sliding member and fastened to a first end of the first, second, and third elastic members.

According to yet another aspect of the present invention, the elastic fasteners include first, second, third, fourth, and fifth elastic fasteners, the first elastic fastener is fastened to the first end of the first elastic member, the second elastic fastener is fastened to the first end of the second elastic member, and the third, fourth, and fifth elastic fasteners are fastened to first ends of the third elastic members.

According to still yet another aspect of the present invention, the link member has a Y-shaped configuration, first and second fastening protrusions are formed on a first end of the link member and fastened to the third elastic members, a coupling hole is formed on a central portion of the link member to provide the link shaft and to be rotatably coupled to the rotation unit, and a guide stopper is formed on a second end of the link member to be coupled to the rotation guide unit so that rotation of the link member is guided and limited.

According to a further aspect of the present invention, the first elastic member includes at least one torsion spring positioned between the first and second sliding members to provide elastic force necessary to slide the first sliding member in the upward direction, and the torsion spring has a first end fastened to the first sliding member and a second end fastened to the first elastic fastener of the second sliding member.

According to yet a further aspect of the present invention, the second elastic member includes a torsion spring positioned on a lower portion of the base member to provide elastic force necessary to slide the first and second sliding members to in the downward and leftward/rightward direction, and the torsion spring has a first end fastened to the elastic fastener formed on the base member and a second end fastened to the second elastic fastener formed on the second sliding member.

According to still a further aspect of the present invention, the third elastic member includes at least one coil spring positioned on an inner surface of the second sliding member and adapted to be compressed and extended repeatedly to provide elastic force necessary to slide the first and second sliding members in the leftward/rightward direction, the coil springs include first, second, third, and fourth coil springs, the first coil spring has a first end fastened to the first end of the third elastic fastener of the second sliding member and a second end fastened to the first fastening protrusion of the link member, the second coil spring has a first end fastened to the first fastening protrusion of the link member and a second end fastened to the fourth elastic fastener of the second sliding member, the third coil spring has a first end fastened to the fourth elastic fastener and a second end fastened to the second fastening protrusion of the link member, and the fourth coil spring has a first end fastened to the second fastening protrusion and a second end fastened to the fifth elastic fastener of the second sliding member.

According to another aspect of the present invention, the first and second fastening protrusions are positioned between the third, fourth, and fifth elastic fasteners, and the first, second, third, and fourth coil springs are positioned between the third, fourth, and fifth elastic fasteners and the first and second fastening protrusions and adapted to be compressed and extended repeatedly to provide the fastening protrusions with elastic force when the sliding housing slides in the leftward/rightward direction.

According to one aspect of the present invention, the main housing has a space hole formed to accommodate the second elastic member and provide elastic force.

In accordance with another aspect of the present invention, a portable electronic device is provided. The portable electronic device includes a main housing, a sliding housing coupled to the main housing while being able to slide in upward, downward, leftward, and rightward directions on the main housing, at least one motion sensor positioned on the main housing to sense a movement of the sliding housing, create a corresponding signal, and apply the signal to a controller, a base member, first and second sliding members stacked on the base member to slide the sliding housing away from the main housing in each direction, a link member rotatably coupled between respective members so that, when the link member rotates about a link shaft, the sliding housing slides in the leftward/rightward direction, at least one first and third elastic members positioned between respective members to provide elastic force necessary to slide the first and second sliding members and at least one fourth elastic member positioned on the second sliding member to provide additional elastic force necessary to slide the first and second sliding members in each direction.

According to one aspect of the present invention, the base member has at least one elastic fastener fastened to a first end of the fourth elastic member.

According to another aspect of the present invention, the second sliding member has at least one guide locking unit coupled to the elastic fastener of the base member while extending through the elastic fastener so that, when the first and second sliding members slide, the guide locking unit moves together to engage with or disengage from the elastic fastener of the base member and limits movements of the first and second sliding members, and the second sliding member has at least one elastic fastener fastened to the first end of the fourth elastic member.

According to yet another aspect of the present invention, the guide locking unit has a "+"-shaped configuration.

According to still a further aspect of the present invention, the guide locking unit includes a first locking hole adapted to move together when the first and second sliding members slide in the downward direction so that the first locking hole engages with or disengage from the elastic fastener of the base member and limits sliding movements of the first and second sliding members in the leftward/rightward direction and a second locking hole formed adjacent to the first locking hole and adapted to move together when the first and second sliding members slide in the leftward/rightward direction so that the second locking hole engages with or disengages from the elastic fastener of the base member and limits sliding movements of the first and second sliding members in the upward/downward direction.

According to yet another aspect of the present invention, the fourth elastic member includes at least one spring for providing elastic force necessary to move the first and second sliding members in the downward and leftward/rightward directions, and the springs have first ends fastened to the elastic fasteners formed on the base member and second ends fastened to the elastic fasteners formed on the second sliding members.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other features, aspects, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
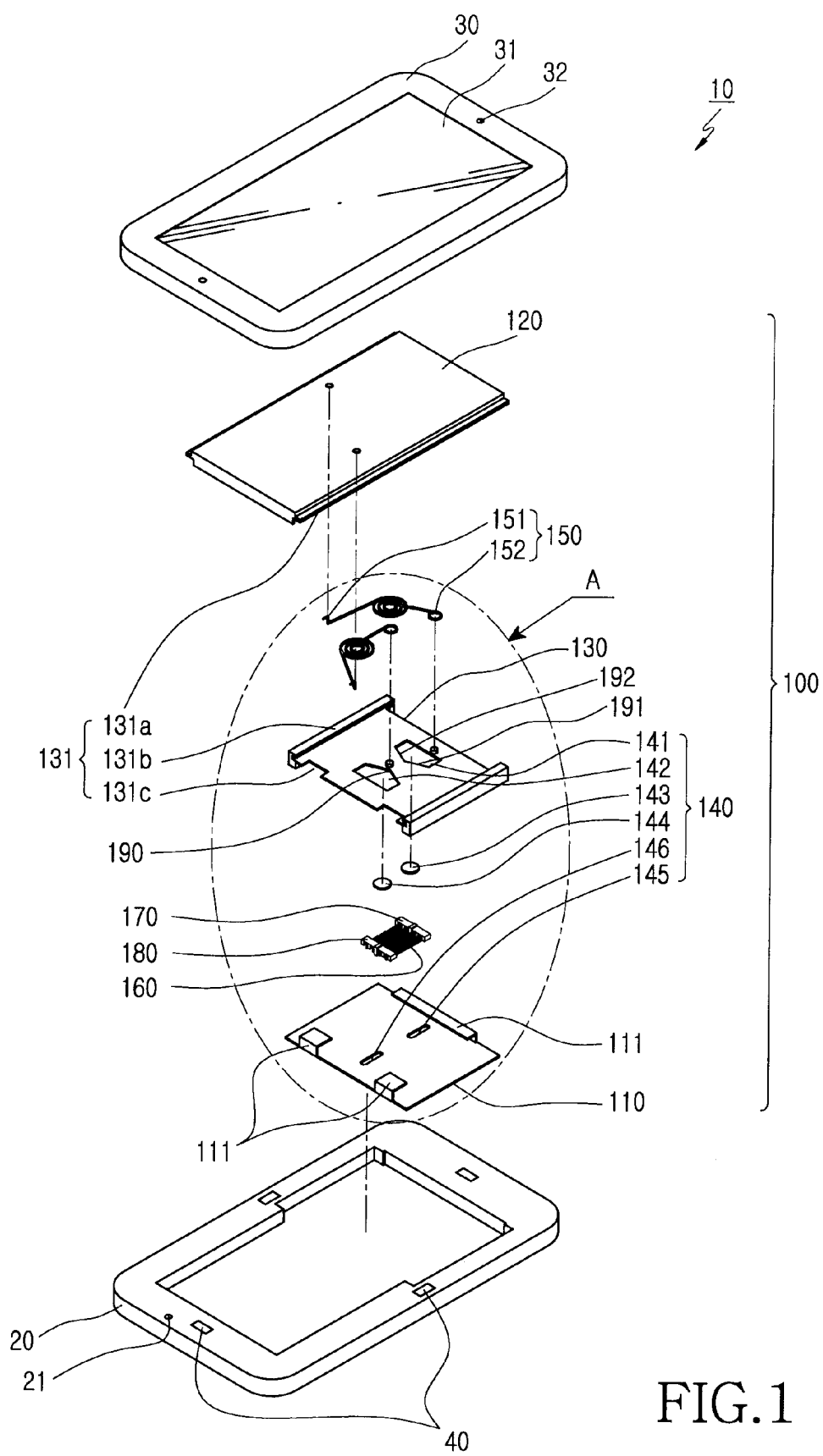
FIG. 1 is an exploded perspective view of a portable electronic device according to an exemplary embodiment of the present invention.
Figure 2:
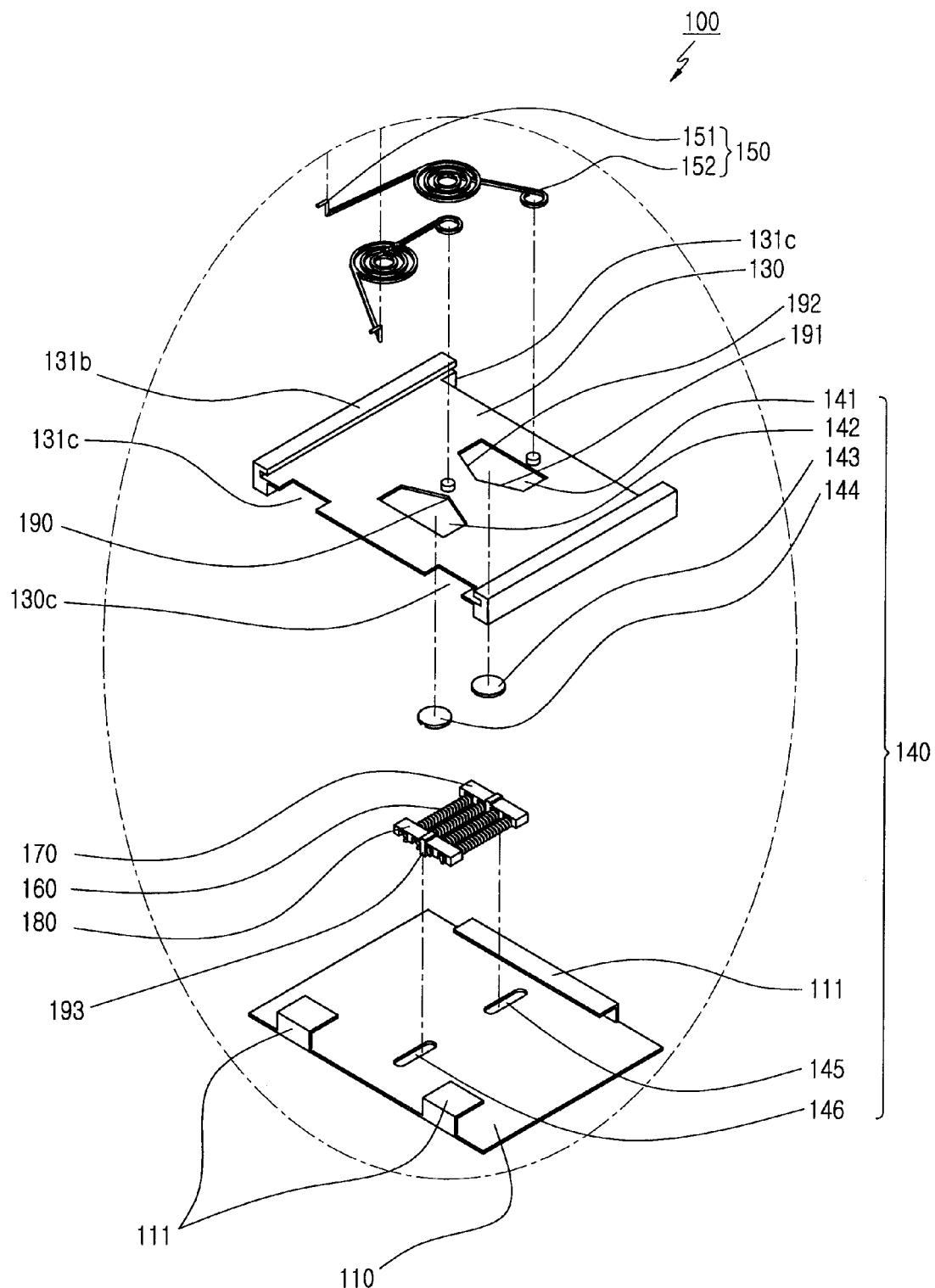
FIG. 2 is an exploded perspective view magnifying part A shown in FIG. 1.
Figure 3:
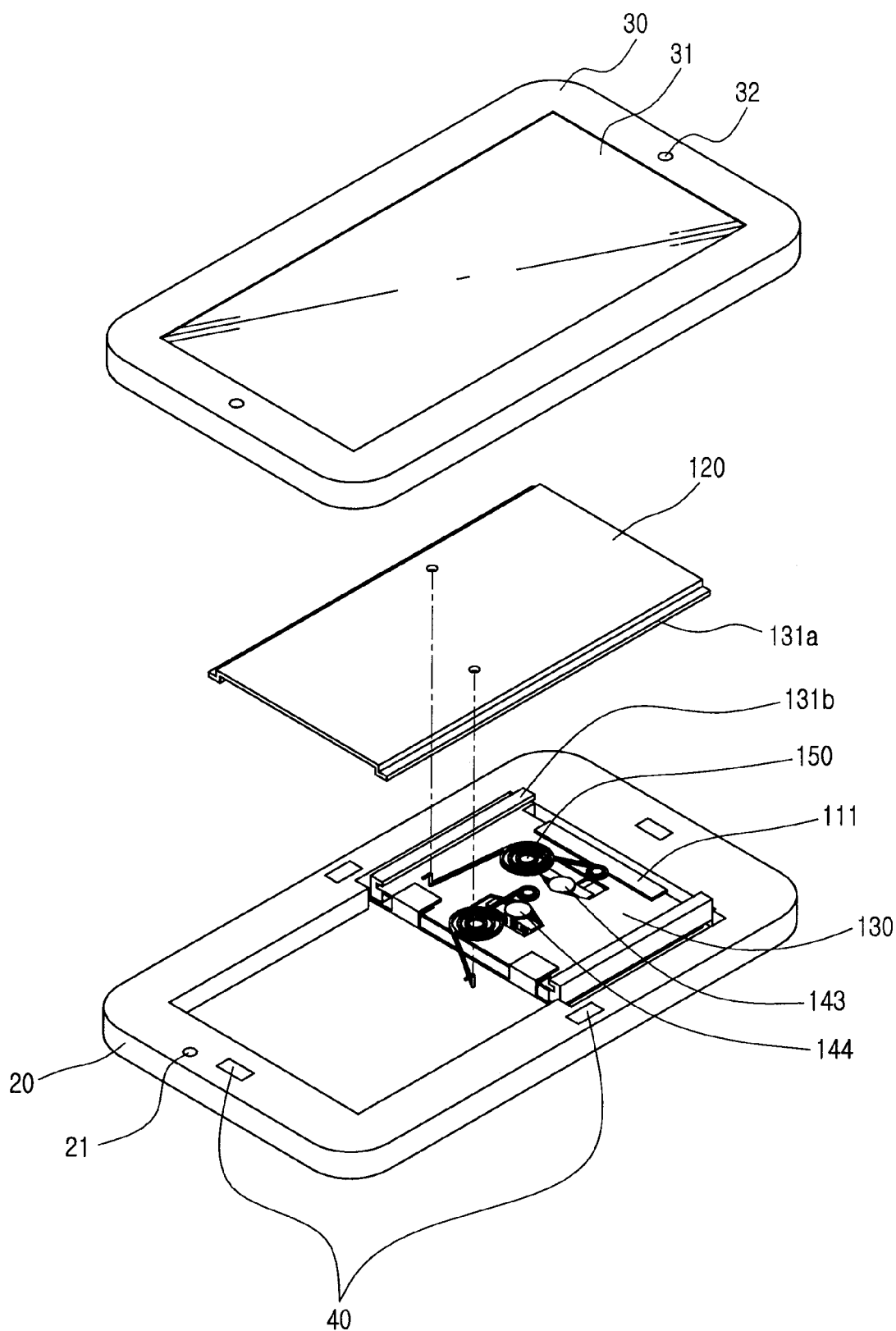
FIG. 3 is an exploded perspective view of a portable electronic device according to an exemplary embodiment of the present invention.

As shown in FIGS. 1-3, a key input device 10 for a portable electronic device according to an exemplary embodiment of the present invention includes a main housing 20, a sliding housing 30, and at least one motion sensor 40. The main housing 20 may include a microphone device 21. The sliding housing 30 has a display unit 31 and may include a speaker device 32. The sliding housing 30 is adapted to face the upper surface of the main housing 20. Particularly, the sliding housing 30 is coupled to the main housing 20 so that it can slide in the upward, downward, leftward, or rightward direction on the upper surface of the main housing 20. The motion sensors 40 are positioned on the main housing 20 to sense the movement of the sliding housing 30 in any of the directions, create a corresponding signal, and apply the signal to a controller (not shown). Though four motion sensors 40 are illustrated, the invention is not so limited and may include more or fewer sensors as required. Furthermore, the controller may be located inside the main housing 20 or elsewhere in the device as space or convenience require.

The sliding housing 30 provides the user with functional or directional input similar to that of character keys, numeric keys, game-dedicated keys, volume keys, channel switching keys, control keys, navigation keys and the like. For example, using the sliding housing 30, the user may provide an input regarding the movement of a cursor on the display unit 31. Alternatively, the sliding housing may be used to control a music player wherein a first sliding direction may indicate a "stop" command and another sliding direction may correlate to a "play" command. Of course, these are merely illustrative examples and not intended to limit the application of the present invention.

In an exemplary implementation, the sliding housing 30 can also slide in the diagonal direction in addition to the upward, downward, leftward, and rightward directions.

As shown in FIGS. 1-3, the sliding device 100 of the key input device 10 for a portable electronic device includes a base member 110, first and second sliding members 120 and 130, a guide member 140, and first and second elastic members 150 and 160. The base member 110 is positioned on the main housing 20 so that the second sliding member 130 can be stacked thereon. As will be explained in more detail with reference to the additional figures, the first sliding member 120 is coupled to the second housing 130 while being able to slide so that the sliding housing 30 can slide away from, that is relative to, the main housing 20 in the upward direction. The second sliding member 130 is coupled to the base member 110 while being able to slide so that the sliding housing 30 can slide away from the main housing 20 in the downward or leftward/rightward direction. The guide member 140 is positioned between the base member 110 and the second sliding member 130 so that the sliding housing 30 can slide away from the main housing 20 in the downward or leftward/rightward direction. The first elastic member 150 is positioned between the first and second sliding members 120 and 130 to provide an elastic force necessary to slide the sliding housing 30 away from the main housing 20 in the upward direction. The second elastic member 160 is positioned between the base member 110 and the second sliding member 130 to provide an elastic force necessary to slide the sliding housing 30 away from the main housing 20 in the downward or leftward/rightward direction.

As shown in FIGS. 1 and 2, the base member 110 has at least one coupling unit 111 coupled to a coupling recess 131c formed on the second sliding member 130 to support the second sliding member 130 so that it can slide in each direction.

As shown in FIGS. 1-5, the second sliding member 130 has a guide unit 131 for guiding the sliding housing 30 so that it can slide away from the main housing 20 in the upward direction. The guide unit 131 includes a guide rib 131a and a guide rail 131b. The guide rib 131a is formed on a longitudinal side of the first sliding member 120 so that it can be coupled to the guide rail 131b while being able to slide. In an exemplary implementation, guide ribs 131a are formed on each of both longitudinal sides of the first sliding member 120. The guide rail 131b is formed on each of both longitudinal sides of the second sliding member 130 so that it is coupled to the guide rib 131a while being able to slide. Furthermore, the guide rail 131b guides the sliding movement of the sliding housing 30 in the upward direction.

As shown in FIGS. 1-6, the first elastic member 150 consists of at least one torsion spring 150 having one end 151 coupled to a fixed coupling unit formed on the first sliding member 120 and the other end 152 coupled to a protrusion formed on the second sliding member 130.

As shown in FIGS. 1, 2, and 7-16, the second elastic member 160 consists of at least one coil spring having first and second elastic movement units 170 and 180 positioned on both ends thereof so that they move in the downward or upward/downward direction and provide elastic force as the second sliding member 130 moves.

As shown in FIGS. 1, 2, and 7-16, the guide member 140 includes first and second guide movement holes 141 and 142, first and second guide movement members 143 and 144, and first and second guide holes 145 and 146. The first and second guide movement holes 141 and 142 are formed on the second sliding member 130 to be coupled to the first and second guide movement members 143 and 144 to guide their movement. The first and second guide movement members 143 and 144 are coupled into the first and second guide movement holes 141 and 142 while being able to slide so that they are coupled to the first and second elastic movement units 170 and 180 of the second elastic member 160. The first and second guide movement members 143 and 144 are guided along the first and second guide movement holes 141 and 142 to move the first and second elastic movement units 170 and 180 in the upward/downward direction when the second sliding member 130 moves in the downward or leftward/rightward direction. The first and second guide holes 145 and 146 are formed on the base member 110 so that they are coupled to coupling protrusions 193 formed on the first and second elastic movement units 170 and 180. The first and second guide holes 145 and 146 guide the upward/downward movement of the first and second elastic movement units 170 and 180 when the first and second guide movement units 143 and 144 move in the upward/downward direction.

As shown in FIGS. 7-16, the first and second guide movement holes 141 and 142 have latching recesses 190 formed at the center so that they contact the first and second guide movement members 143 and 144 when the second sliding member 130 is at the initial location. Furthermore, when the second sliding member 130 slides downward, the first and second guide movement holes 141 and 142 travel downward together and disengage from the first guide movement member 143. In this case, the second guide movement member 144 remains engaged and travels together while maintaining contact with the latching recess 190 and moves the second elastic movement unit 180 so that the second elastic member 160 is extended/compressed.

As shown in FIGS. 7-16, the first and second guide movement holes 141 and 142 have first and second slanted guide surfaces 191 and 192 formed thereon, respectively, so that they face the first and second guide movement members 143 and 144. Because the first and second guide surfaces 191 and 192 are slanted, when the second sliding member 130 slides in the leftward/rightward direction, the first and second guide movement members 143 and 144 slide in the upward/downward direction together with the first and second elastic movement units 170 and 180 in order to extend/compress the second elastic member 160.

A procedure of operating a sliding device of a key input device for a portable electronic device according to an exemplary embodiment of the present invention, which is constructed as mentioned above, will now be described in more detail with reference to FIGS. 1-16.

As shown in FIGS. 1-3, the sliding device 100 of the key input device 10 for a portable electronic device includes a main housing 20, a sliding housing 30, at least one motion sensor 40, a base member 110, first and second sliding members 120 and 130, a guide member 140, and first and second elastic members 150 and 160.

The second sliding member 130 is coupled to the upper surface of the base member 110 while being able to slide in the downward or leftward/rightward direction. Particularly, the coupling unit 111 formed on the base member 110 is coupled to the coupling recess 131c formed on the second sliding member 130.

The guide member 140 is positioned between the base member 110 and the second sliding member 130 to guide the second sliding member 130 so that it can slide in the downward or leftward/rightward direction.

The first sliding member 120 is coupled to the upper surface of the second sliding member 130 while being able to slide in the upward direction. More specifically, the guide rib 131a of the first sliding member 120 is coupled to the guide rail 131b of the second sliding member 130 while being able to slide.

The first elastic member 150 is positioned between the first and second sliding members 120 and 130 to provide an elastic force necessary to slide the first sliding member 120 in the upward direction. The second elastic member 160 is positioned between the base member 110 and the second sliding member 130 to provide an elastic force necessary to slide the second sliding member 130 in the downward or leftward/rightward direction.

In this condition, the base member 110 is fastened to the main housing 20, and the first sliding member 120 is fastened to the sliding housing 30.

In the illustrated example, the main housing 20 has four motion sensors 40 positioned on its upper, lower, left, and right surfaces to sense the movement of the sliding housing 30 in each direction and create a corresponding signal. Of course, this is merely for example and the present invention is not limited there to.

Figure 4:
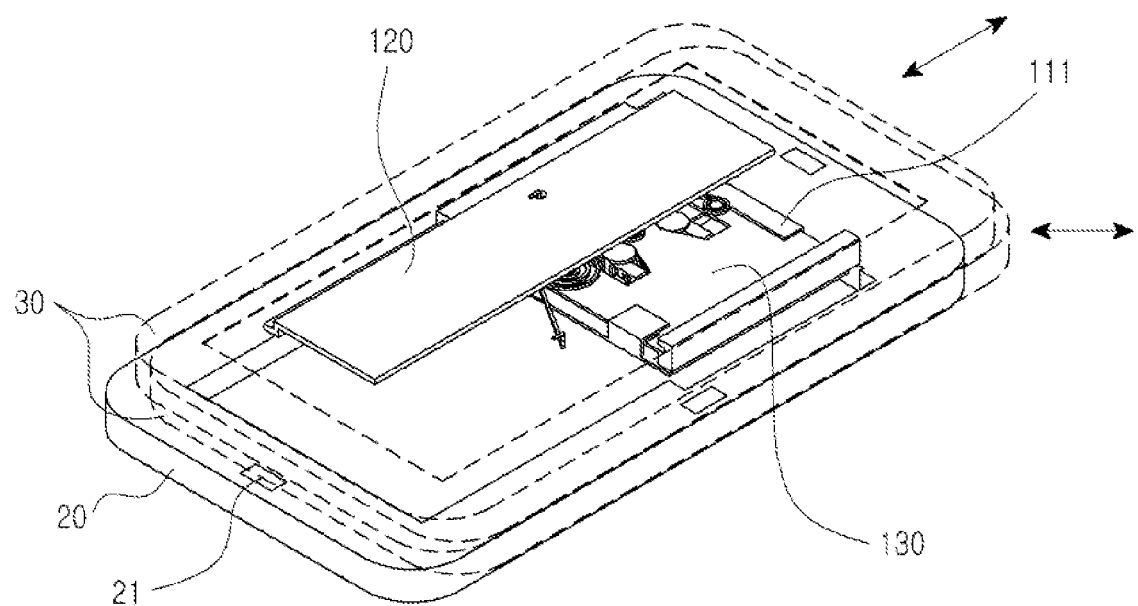
FIG. 4 is a perspective view of a portable electronic device according to an exemplary embodiment of the present invention when the sliding housing is moved upward or diagonally.
Figure 5:
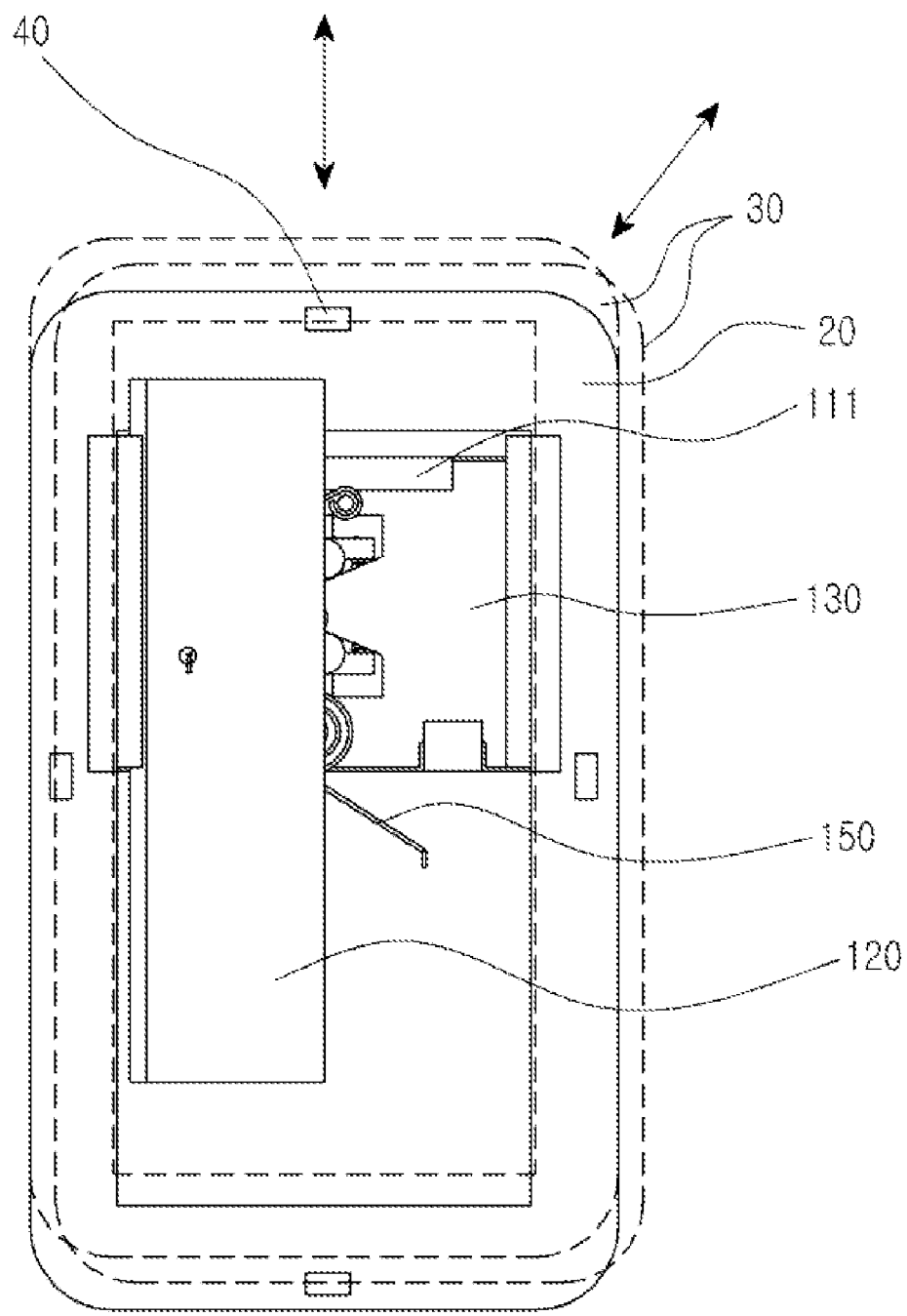
FIG. 5 is a front view of a portable electronic device according to an exemplary embodiment of the present invention when the sliding housing is moved upward or diagonally.
Figure 6:
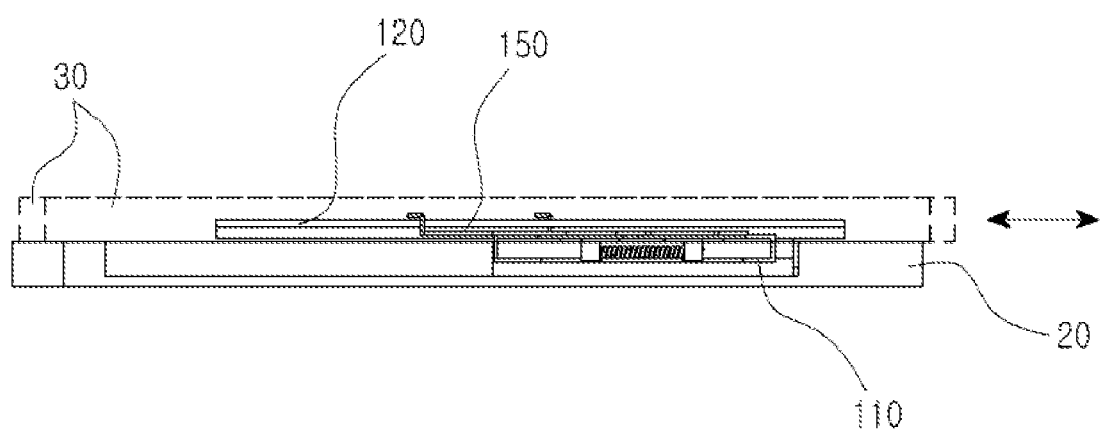
FIG. 6 is a lateral sectional view of a portable electronic device according to an exemplary embodiment of the present invention when the sliding housing is moved upward or diagonally.
Figure 7:
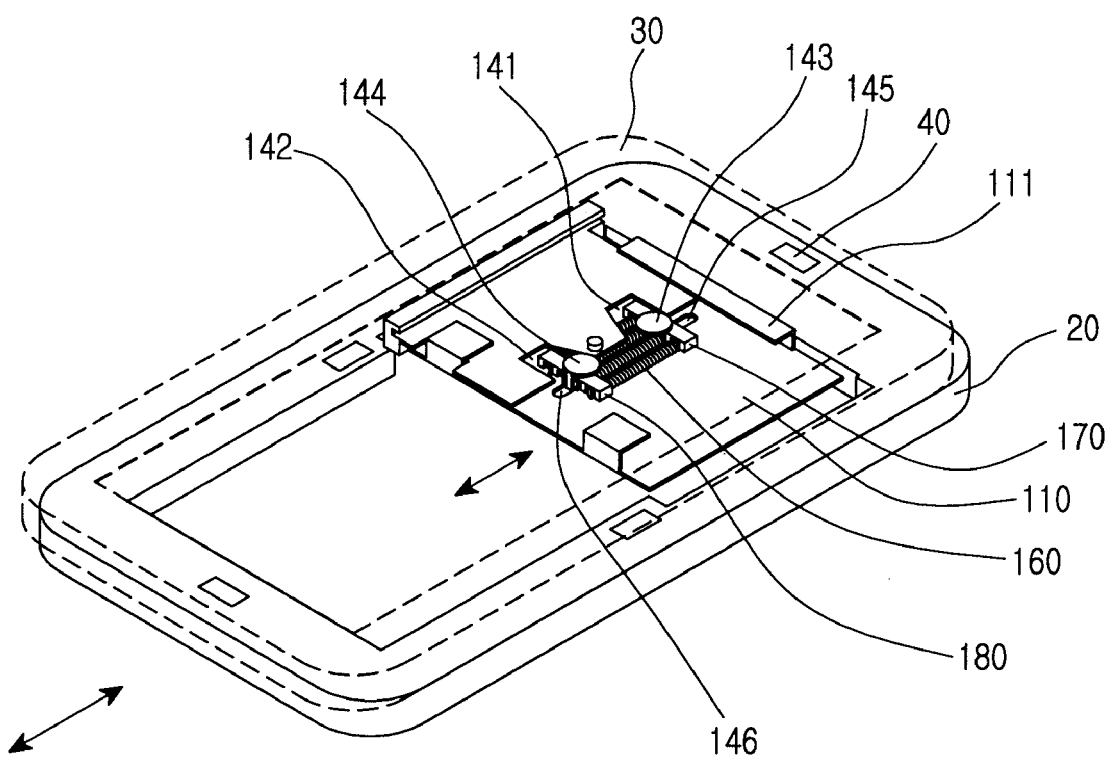
FIG. 7 is a perspective view of a portable electronic device according to an exemplary embodiment of the present invention when the sliding housing is moved downward.

As shown in FIGS. 4-6, when the user wants to provide a key input, for example to operate a character key, a numeric key, a game-dedicated key, a volume key, a channel switching key, a navigation key, a control key and the like, provided by the sliding housing 30, the user may slide the sliding housing 30 away from the main housing 20 in the upward direction or the diagonal direction.

As shown in FIG. 5, the first sliding member 120 slides together with the sliding housing 30, and the guide rib 131a of the first sliding member 120 slides along the guide rail 131b of the second sliding member 130 in the upward direction.

When the sliding housing 30 slides in the upward direction, a motion sensor 40, for example the motion sensor 40 on the upper side of the main housing 20, senses the movement, creates a corresponding signal, and applies the signal to the controller (not shown). In an exemplary implementation, the controller may reside in the main housing 20.

Depending on the input signal, the controller enables the user to provide an input to operate the corresponding character key, numeric key, game-dedicated key, volume key, channel switching key, navigation key, control key and the like.

If the user releases the sliding housing 30, it returns to its original location by means of the first elastic member 150. The sliding housing 30 and the main housing 20 remain facing each other.

As shown in FIGS. 7-10, when the user moves the sliding housing 30 downward, the first and second sliding members 120 and 130 move together in the downward direction as do the first and second guide holes 141 and 142 formed on the second sliding member 130.

Figure 8:
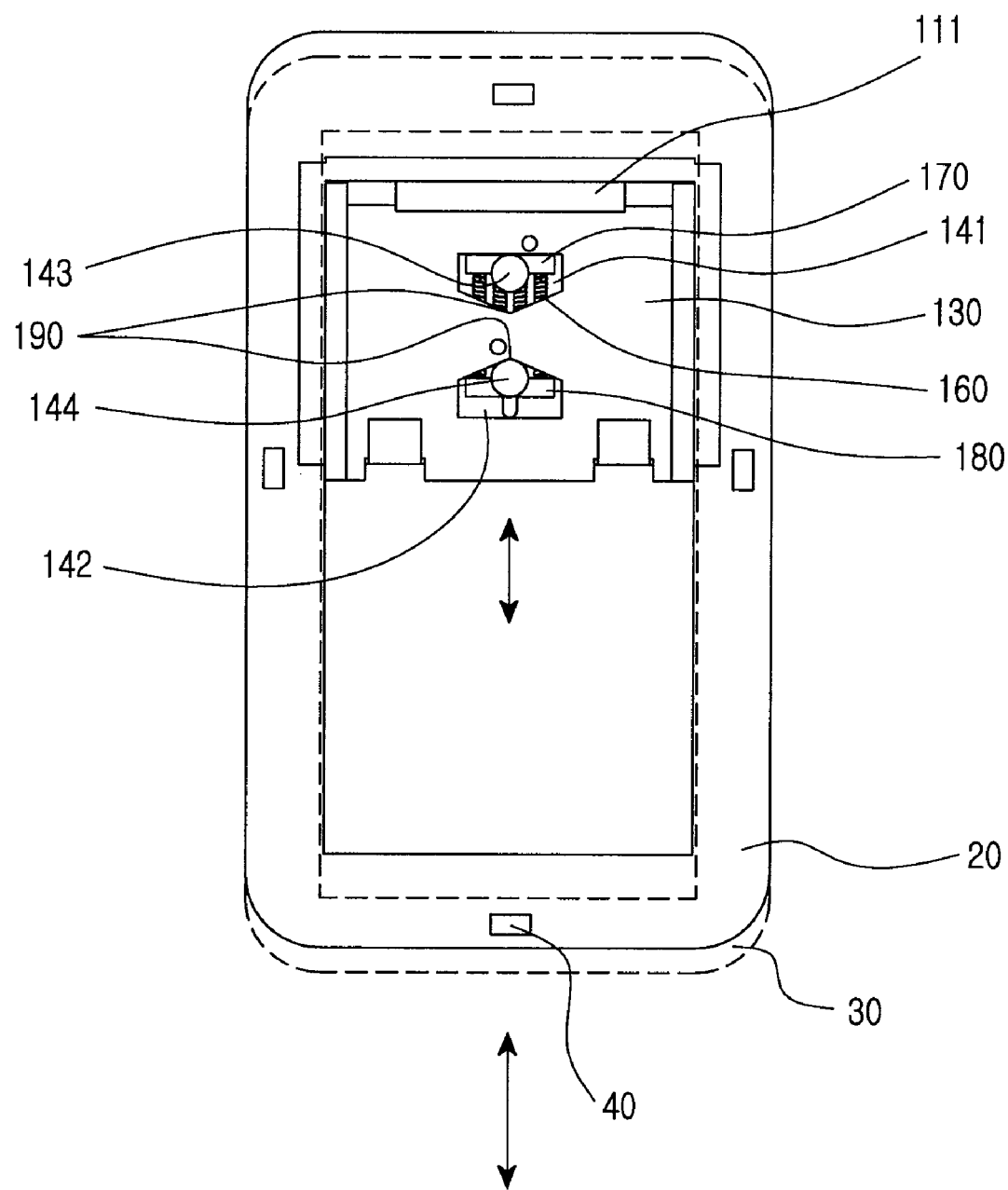
FIG. 8 is a front view of a portable electronic device according to an exemplary embodiment of the present invention when the sliding housing is moved downward.
Figure 9:
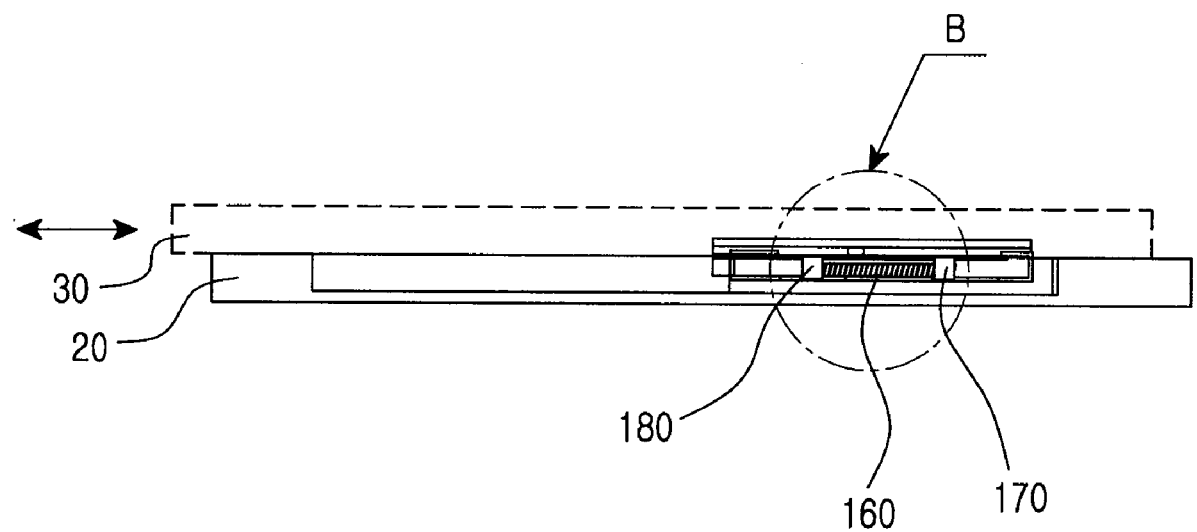
FIG. 9 is a lateral sectional view of a portable electronic device according to an exemplary embodiment of the present invention when the sliding housing is moved downward.
Figure 10:
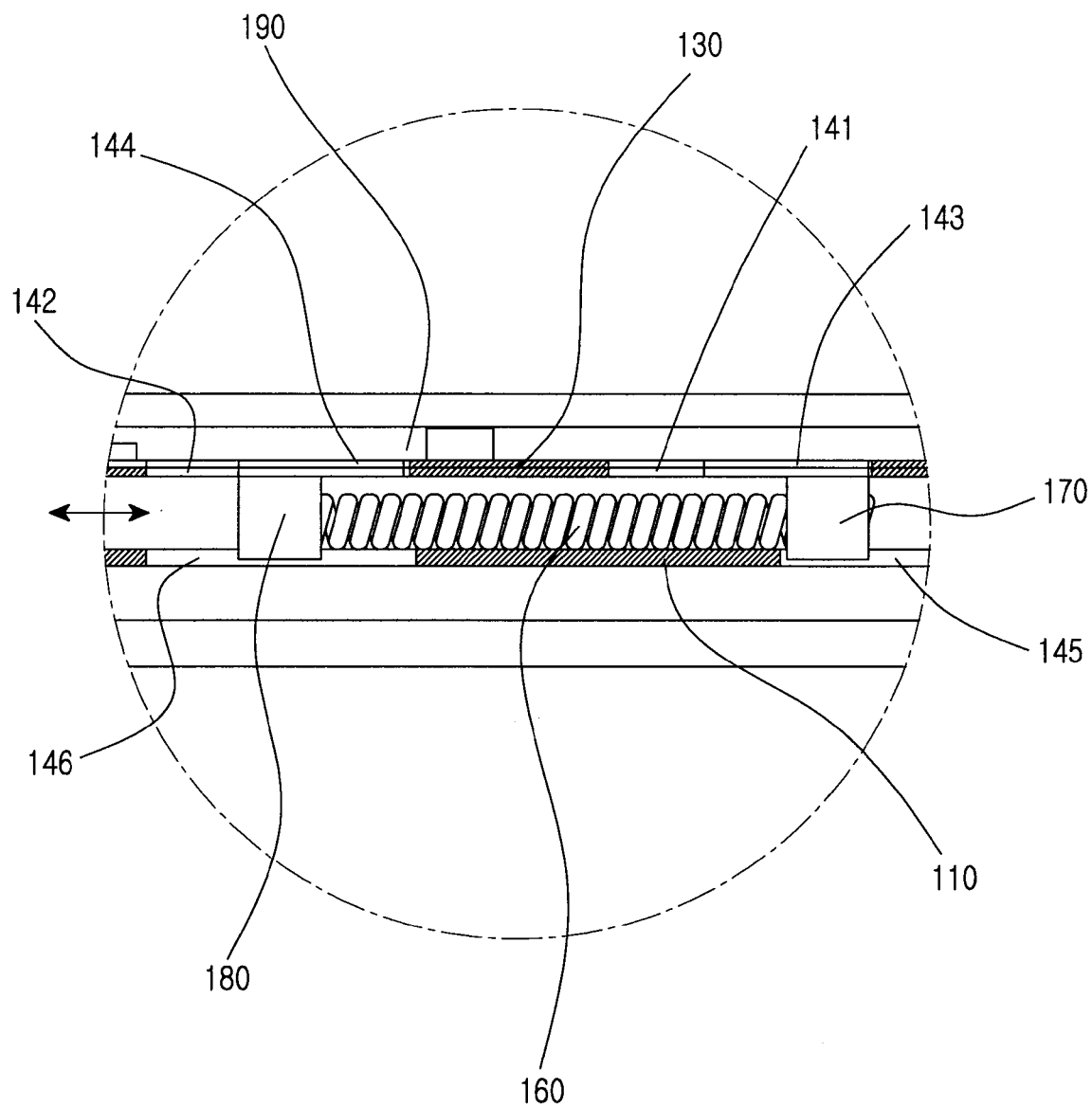
FIG. 10 is a lateral sectional view magnifying part B shown in FIG. 9.
Figure 11:
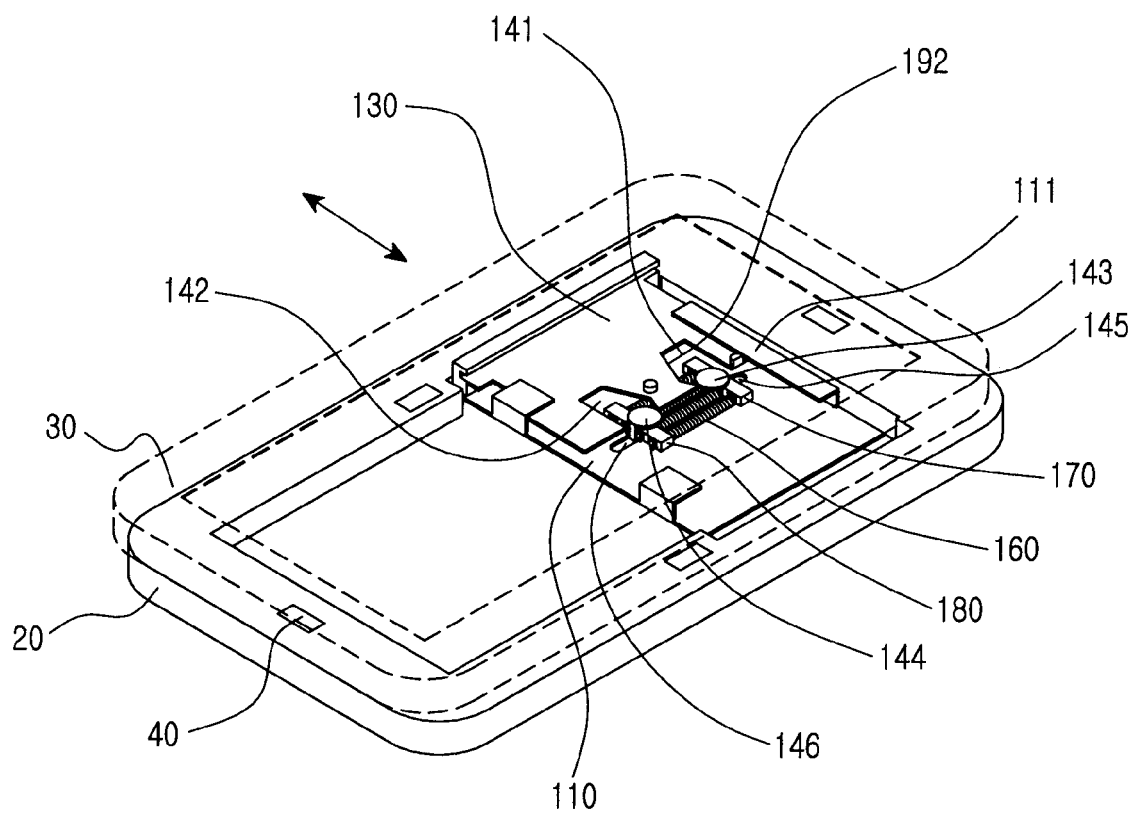
FIG. 11 is a perspective view of a portable electronic device according to an exemplary embodiment of the present invention when the sliding housing is moved leftward.
Figure 12:
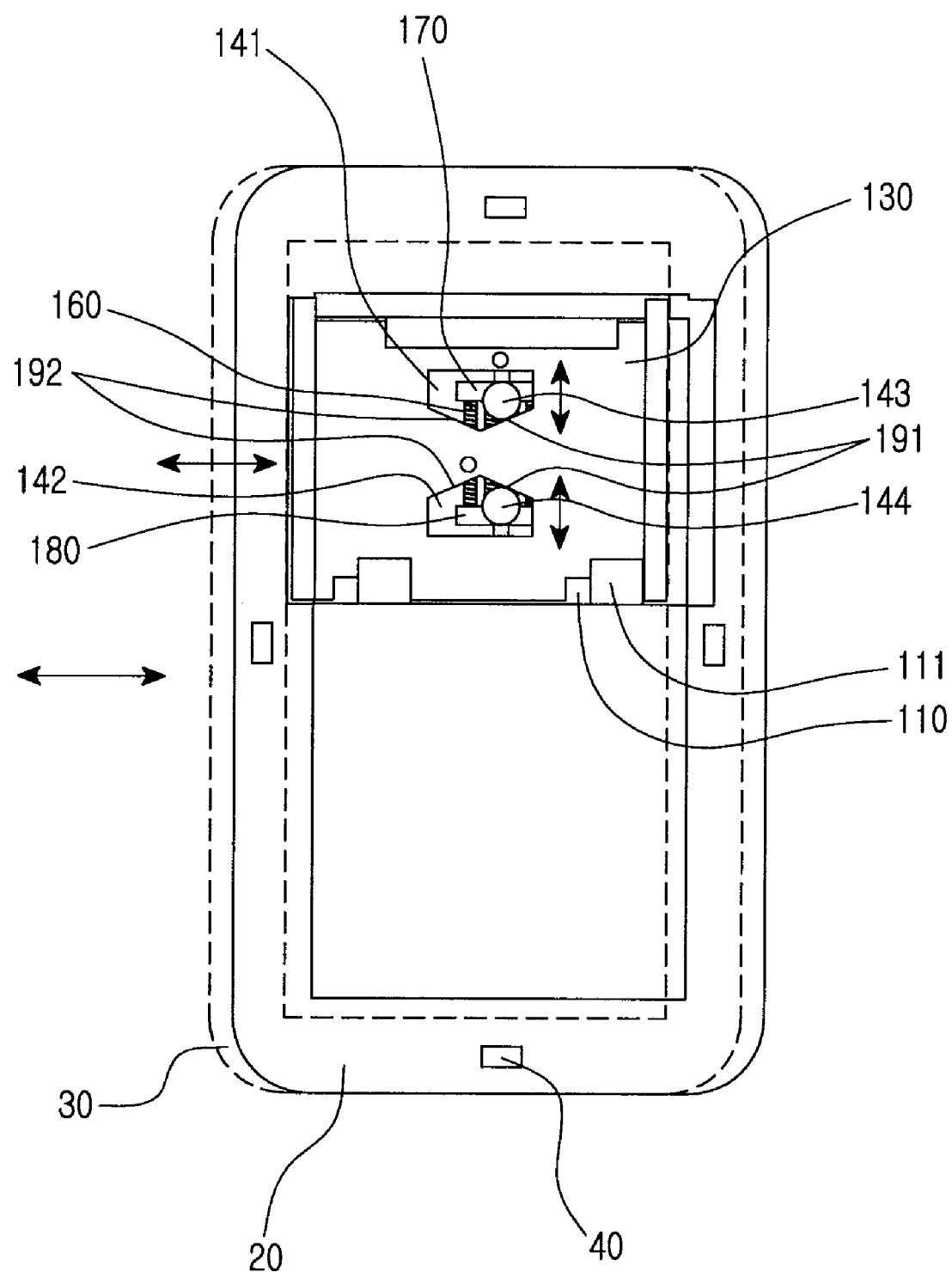
FIG. 12 is a top view of a portable electronic device according to an exemplary embodiment of the present invention when the sliding housing is moved leftward.

As shown in FIGS. 8-10, the second guide movement member 144 in the second guide movement hole 142 moves together with the latching recess 190 formed on the second guide movement hole 142 while making contact with it. Also, the first guide movement member 143 in the first guide movement hole 141 disengages from the latching recess 190 formed on the first guide movement hole 141.

The second guide movement member 144 moves downward together with the latching recess 190 of the second guide movement hole 142. The second elastic movement unit 180 also moves in the downward direction.

The downward movement of the second elastic movement unit 180 extends the second elastic member 160.

The first elastic movement unit 170 engages with the first guide hole 145 and stops moving further.

As shown in FIGS. 9 and 10, the second elastic movement unit 180 moves downward along the second guide hole 146 and extends the second elastic member 160 while the first elastic movement unit 170 engages with the first guide hole 145.

A motion sensor 40, for example the motion sensor 40 on the lower side of the main housing 20, senses the movement, creates a corresponding signal, and applies the signal to the controller (not shown). Again, the controller may be located in the main housing 20.

Depending on the input signal, the controller enables the user to provide an input to operate the corresponding character key, numeric key, game-dedicated key, volume key, channel switching key, navigation key, control key and the like.

If the user releases the sliding housing 30, the second elastic member 160 is compressed again and returns to the original location. At the same time, the second elastic movement unit 180 and the first and second sliding members 120 and 130 return to the original location. The sliding housing 30 and the main housing 20 stay facing each other.

As shown in FIGS. 11-14, when the user slides the sliding housing 30 in the leftward direction, the first and second sliding members 120 and 130 move together in the leftward direction. The first and second guide movement members 143 and 144 escape from the latching recesses 190 and are guided along the first slanted guide surface 191.

Figure 13:
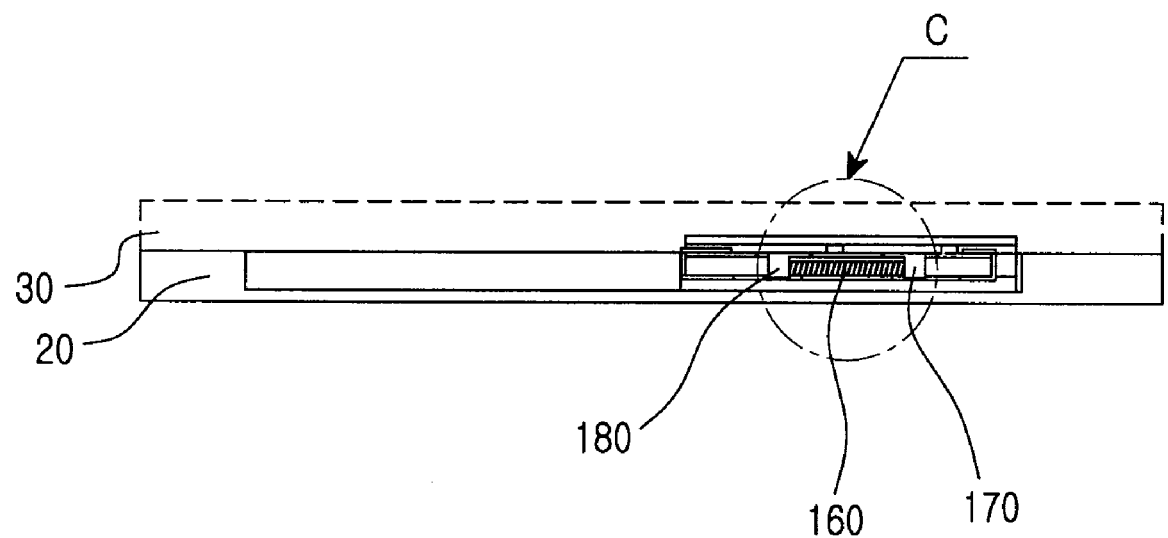
FIG. 13 is a lateral sectional view of a portable electronic device according to an exemplary embodiment of the present invention when the sliding housing is moved leftward.
Figure 14:
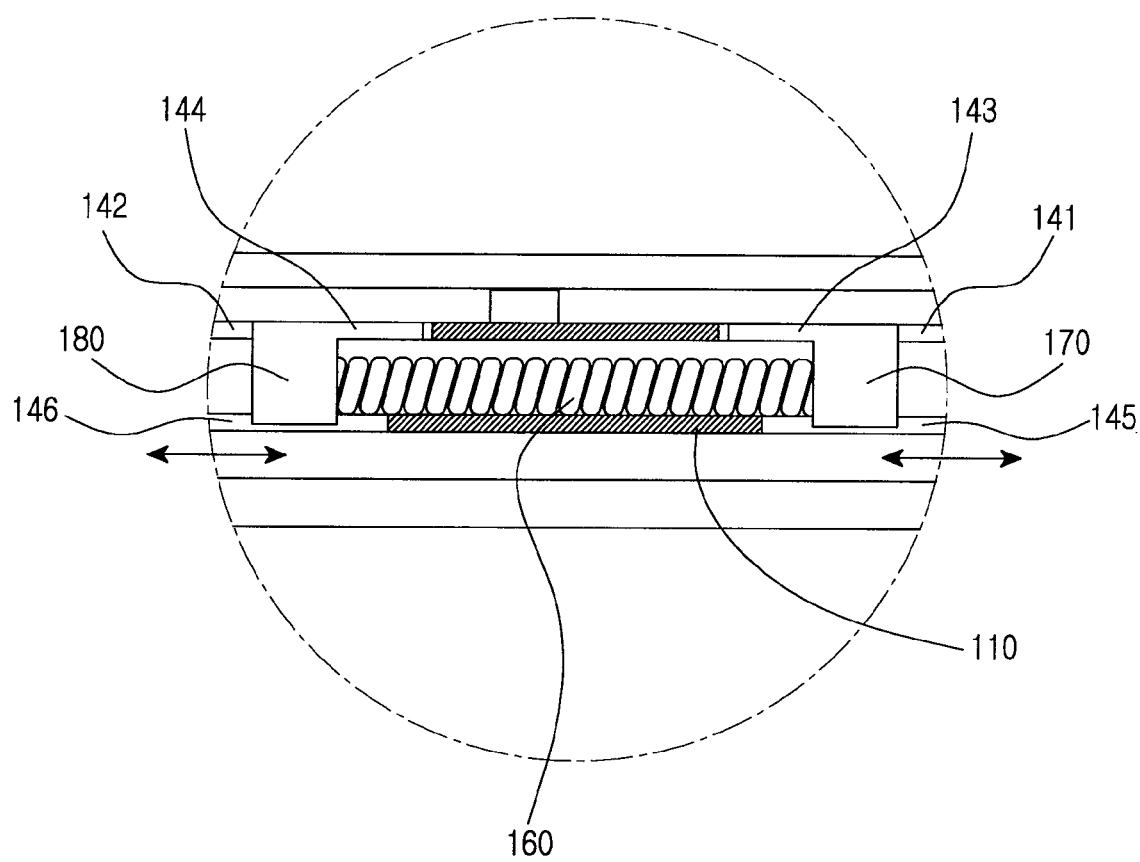
FIG. 14 is a lateral sectional view magnifying part C shown in FIG. 13.

As shown in FIGS. 13 and 14, the first and second guide movement members 143 and 144 move along the first slanted guide surface 191 in the upward/downward direction, and extend the second elastic member 160.

One of the motion sensors 40, for example the motion sensor 40 on the left side of the main housing 20, senses the movement, creates a corresponding signal, and applies the signal to the controller (not shown). Again, the controller may be located in the main housing 20.

Depending on the input signal, the controller enables the user to provide an input to operate the corresponding character key, numeric key, game-dedicated key, volume key, channel switching key, navigation keys, control key and the like.

If the user releases the sliding housing 30, the second elastic member 160 is compressed again and returns to the original location. The first and second guide movement members 143 and 144 return to the original location and contact the latching recesses 190 after being inserted into them. The second elastic movement unit 180 and the first and second sliding members 120 and 130 return to the original location together. The sliding housing 30 and the main housing stay facing each other.

Figure 15:
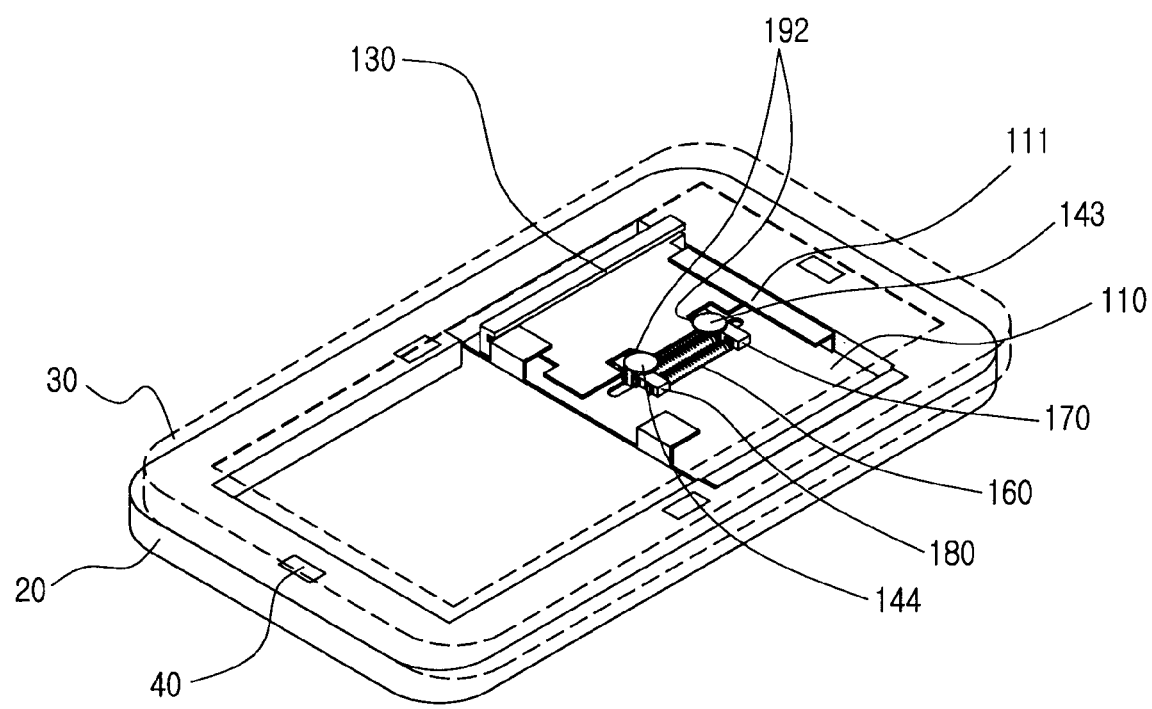
FIG. 15 is a perspective view of a portable electronic device according to an exemplary embodiment of the present invention when the sliding housing is moved rightward.
Figure 16:
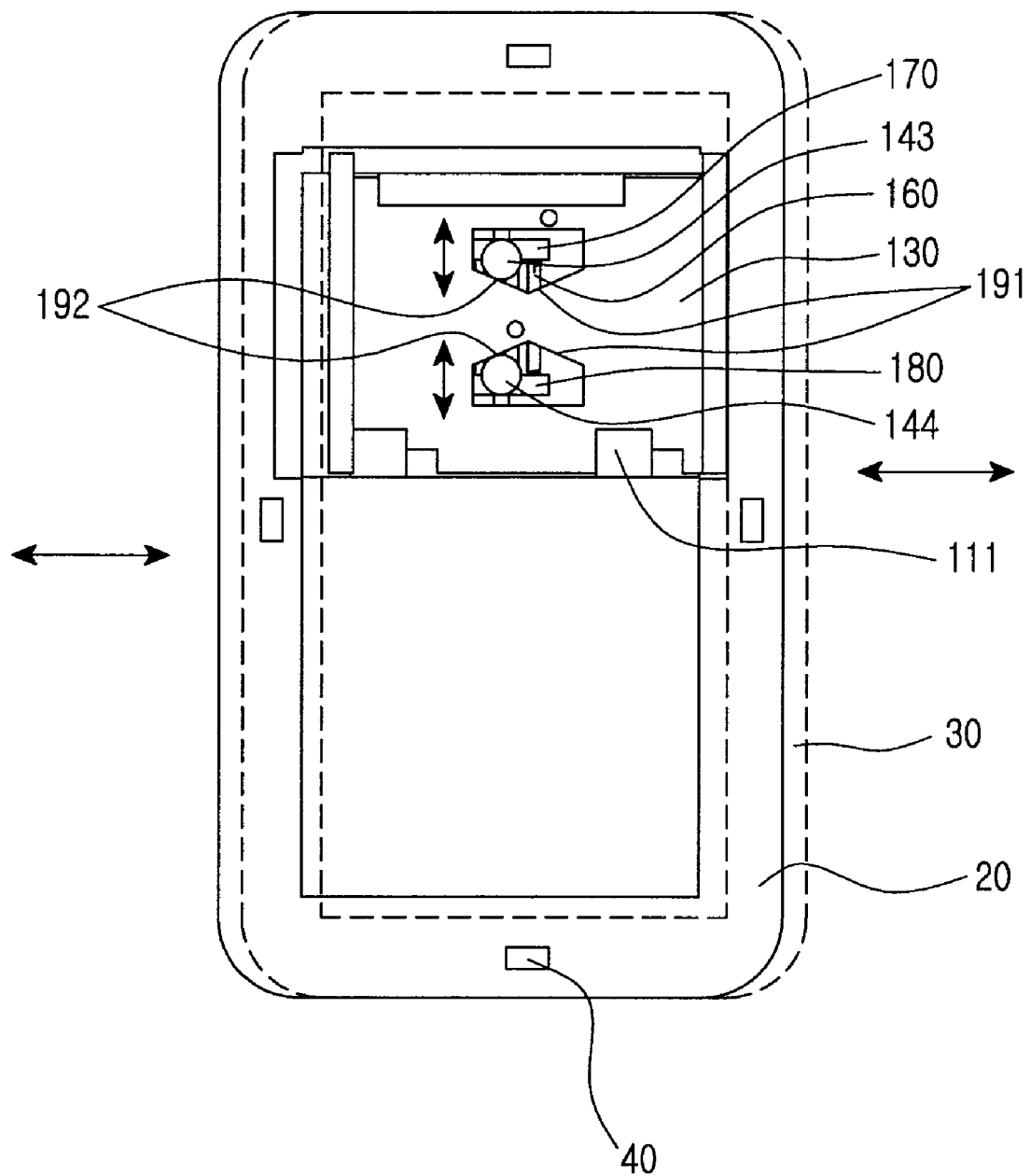
FIG. 16 is a top view of a portable electronic device according to an exemplary embodiment of the present invention when the sliding housing is moved rightward.

As shown in FIGS. 15 and 16, when the user slides the sliding housing 30 in the rightward direction, the first and second sliding members 120 and 130 move together in the rightward direction. The first and second guide movement members 143 and 144 escape from the latching recesses 190 and are guided along the second slanted guide surface 192.

The first and second guide movement members 143 and 144 move along the second slanted guide surface 192 in the upward/downward direction, and extend the second elastic member 160.

One of the motion sensors 40, for example the motion sensor 40 on the right side of the main housing 20, senses the movement, creates a corresponding signal, and applies the signal to the controller (not shown), Again, the controller may be located in the main housing 20.

Depending on the input signal, the controller enables the user to provide an input to operate the corresponding character key, numeric key, game-dedicated key, volume key, channel switching key, navigation keys, control key and the like.

If the user releases the sliding housing 30, the second elastic member 160 is compressed again and returns to the original location. The first and second guide movement members 143 and 144 return to the original location and contact the latching recesses 190 after being inserted into them. The second elastic movement unit 180 and the first and second sliding members 120 and 130 return to the original location together. The sliding housing 30 and the main housing stay facing each other.

A procedure of operating a sliding device of a key input device for a portable electronic device according to another exemplary embodiment of the present invention will now be described in more detail with reference to FIGS. 17-30.

Figure 17:
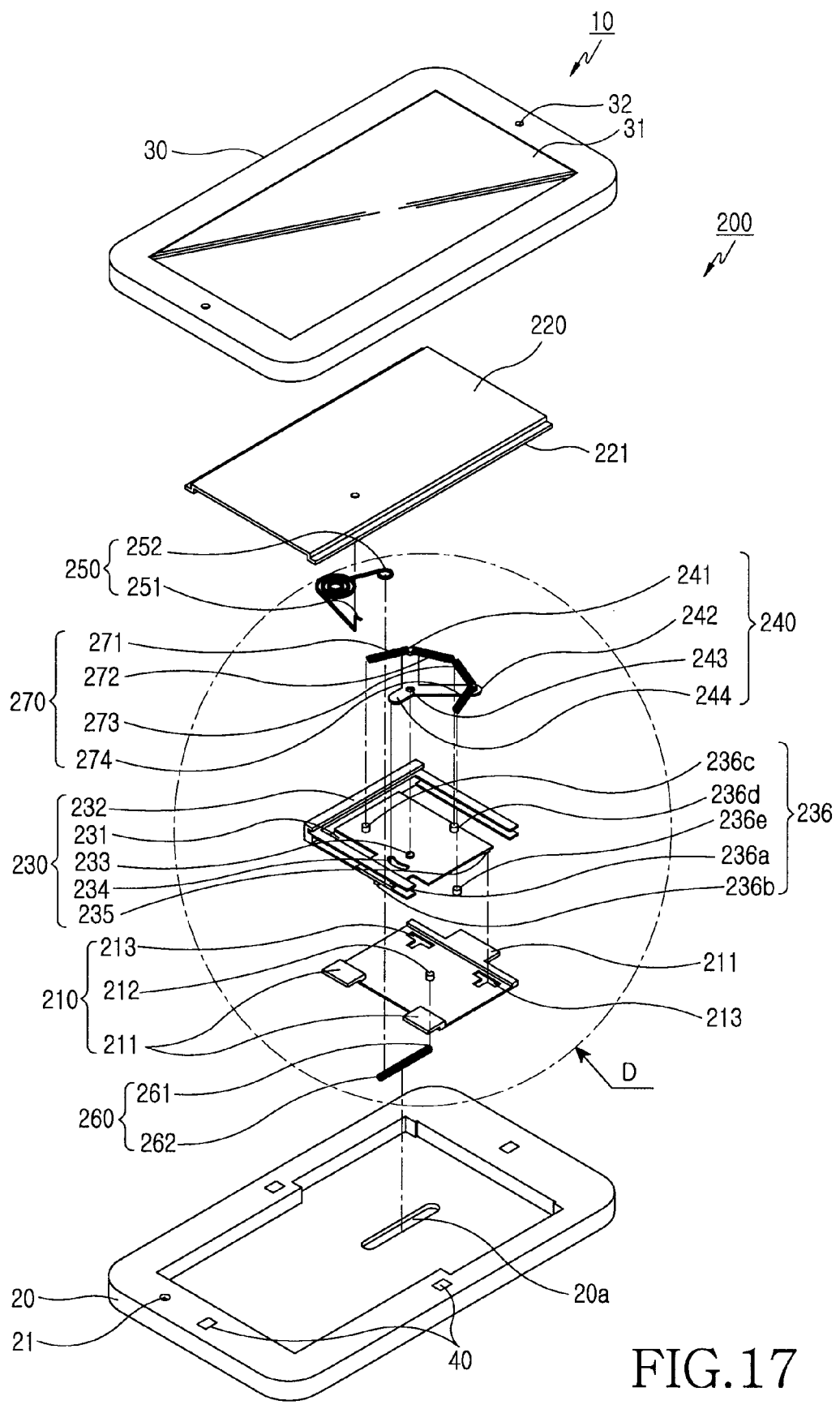
FIG. 17 is an exploded perspective view of a portable electronic device according to an exemplary embodiment of the present invention.
Figure 18:
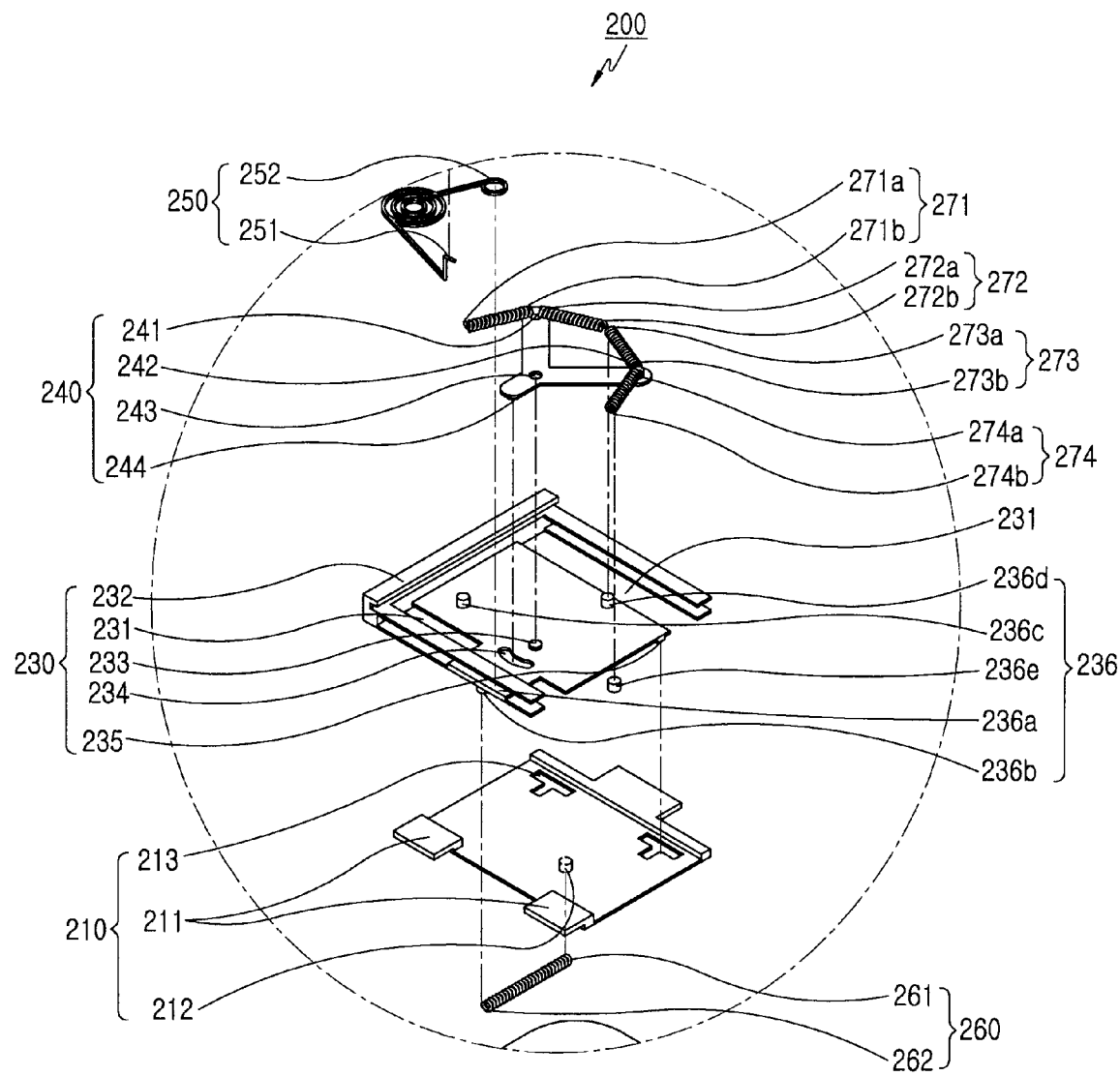
FIG. 18 is an exploded perspective view magnifying part D shown in FIG. 17.
Figure 19:
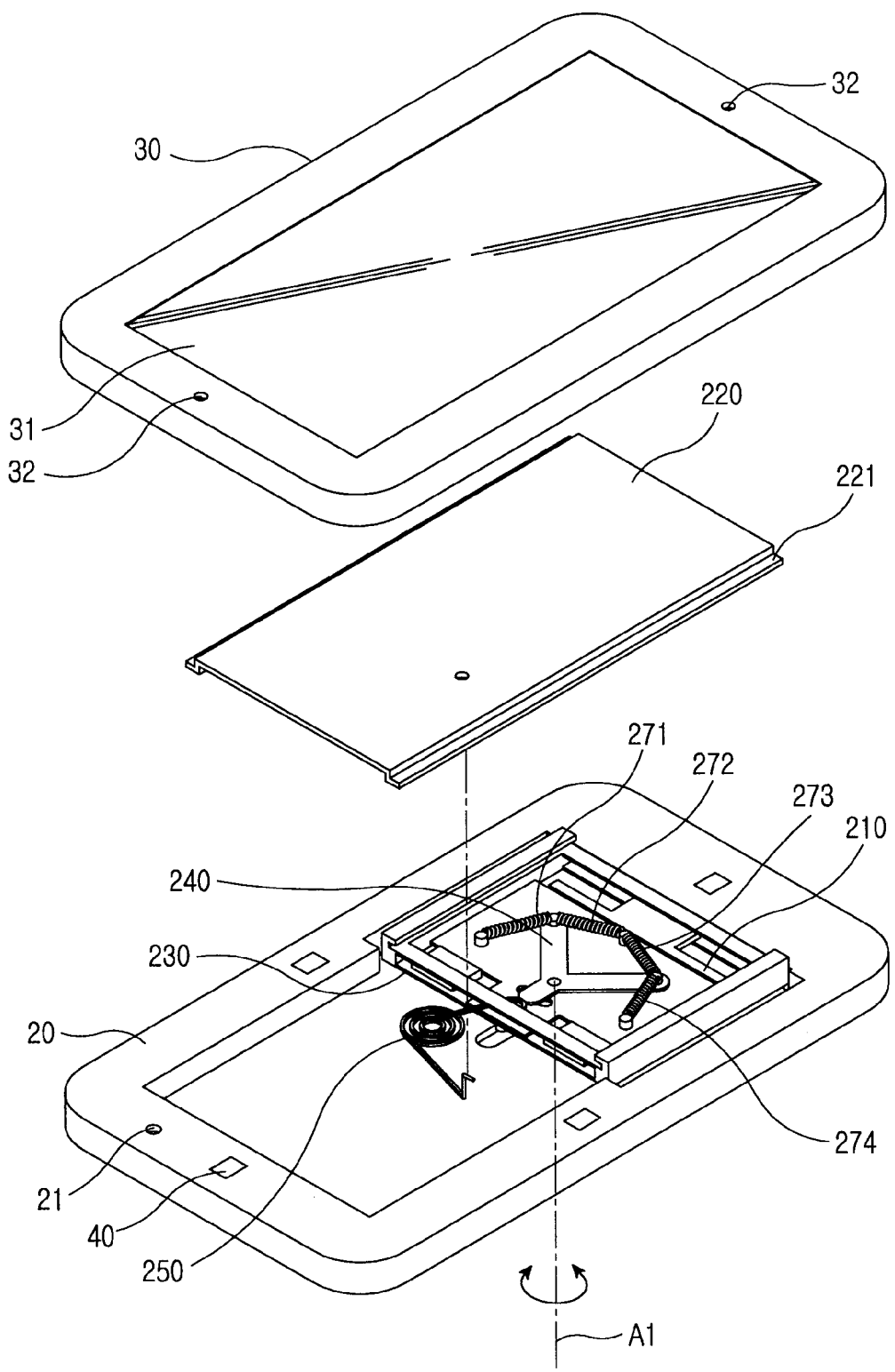
FIG. 19 is an exploded perspective view of a portable electronic device according to an exemplary embodiment of the present invention.

As shown in FIGS. 17-19, a sliding device 200 of a key input device 10 for a portable electronic device includes a main housing 20, a sliding housing 30, at least one motion sensor 40, a base member 210, first and second sliding members 220 and 230, a link member 240, and first, second, and third elastic members 250, 260, and 270. The first and second sliding members 220 and 230 are stacked on the base member 210 so that the sliding housing 30 can slide away from, that is, relative to, the main housing 20 in the upward, downward, leftward, or rightward direction. The link member 240 is rotatably coupled to the first and second sliding members 220 and 230 so that, when the link member 240 rotates about a link axis A1, the sliding housing 30 can slide in the leftward or rightward direction. The first, second, and third elastic members 250, 260, and 270 are positioned between the first and second sliding members 220 and 230 to provide an elastic force necessary for sliding movements of the first and second sliding members 220 and 230.

As shown in FIGS. 17-19, the base member 210 has at least one guide protrusion 211 formed on an end so that the guide protrusion 211 is coupled to a guide hole 231 formed on the second sliding member 230 to support and guide the sliding movement of the second sliding member 230 in each direction.

One end 261 of the second elastic member 260 is fastened to an elastic fastener 212 formed on the base member 210, and the other end 262 of the second elastic member 260 is fastened to a second elastic fastener 236b formed on the second sliding member 230.

In an exemplary implementation, the second elastic member 260 consists of a coil spring.

As shown in FIG. 18, the base member 210 has a guide movement hole 213 formed thereon, to which a guide member 235 formed on the lower surface of the second sliding member 230 is coupled.

As shown in FIGS. 17 and 18, a rotation unit 233 formed on the second sliding member 230 is rotatably coupled to a coupling hole 243 of the link member 240, and a guide stopper 244 of the link member 240 is coupled to a rotation guide unit 234 formed on the second sliding member 230. First and second fastening protrusions 241 and 242 are formed on respective ends of the link member 240, and are positioned among third, fourth, and fifth elastic fasteners 236c, 236d, and 236e formed inside the second sliding member 230.

As shown in FIGS. 17-19, the third elastic members 270 are fastened between the first and second fastening protrusions 241 and 242 and the third, fourth, and fifth elastic fasteners 236c, 236d, and 236e.

The third elastic members 270 include first, second, third, and fourth coil springs 271, 272, 273, and 274.

One end 271a of the first coil spring 271 is fastened to one end of the third elastic fastener 236c of the second sliding member 230, and the other end 271b of the first coil spring 271 is fastened to the first fastening protrusion 241 of the link member 240.

One end 272a of the second coil spring 272 is fastened to the first fastening protrusion 241 of the link member 240, and the other end 272b of the second coil spring 272 is fastened to the fourth elastic fastener 236d of the second sliding member 230.

One end 273a of the third coil spring 273 is fastened to the fourth elastic fastener 236d, and the other end 273b of the third coil spring 273 is fastened to the second fastening protrusion 242 of the link member 240.

One end 274a of the fourth coil spring 274 is fastened to the second fastening protrusion 242, and the other end 274b of the fourth coil spring 274 is fastened to the fifth elastic fastener 236e of the second sliding member 230.

In this condition, one end 251 of the first elastic member 250 is fastened to the first sliding member 220, and the other end 252 of the first elastic member 250 is fastened to the first elastic fastener 236a of the second sliding member 230. The first elastic member 250 consists of a torsion spring.

The first sliding member 220 has guide rails 221 formed on both lateral surfaces, and the guide rails 221 are coupled to guide units 232 formed on both lateral surfaces of the second sliding member 230 while being able to slide.

In this condition, the base member 210 is fastened to the main housing 20, and the second elastic member 260 on the lower surface of the base member 210 is coupled to a space hole 20a formed on the main housing 20. The first sliding member 220 is fastened to the sliding housing 30.

In the illustrated example, the main housing 20 has four motion sensors 40 on its upper, lower, left, and right surfaces, respectively, to sense the direction of movement of the sliding housing 30 and create a corresponding signal. Of course, this is merely for example and the present invention is not limited there to.

Figure 20:
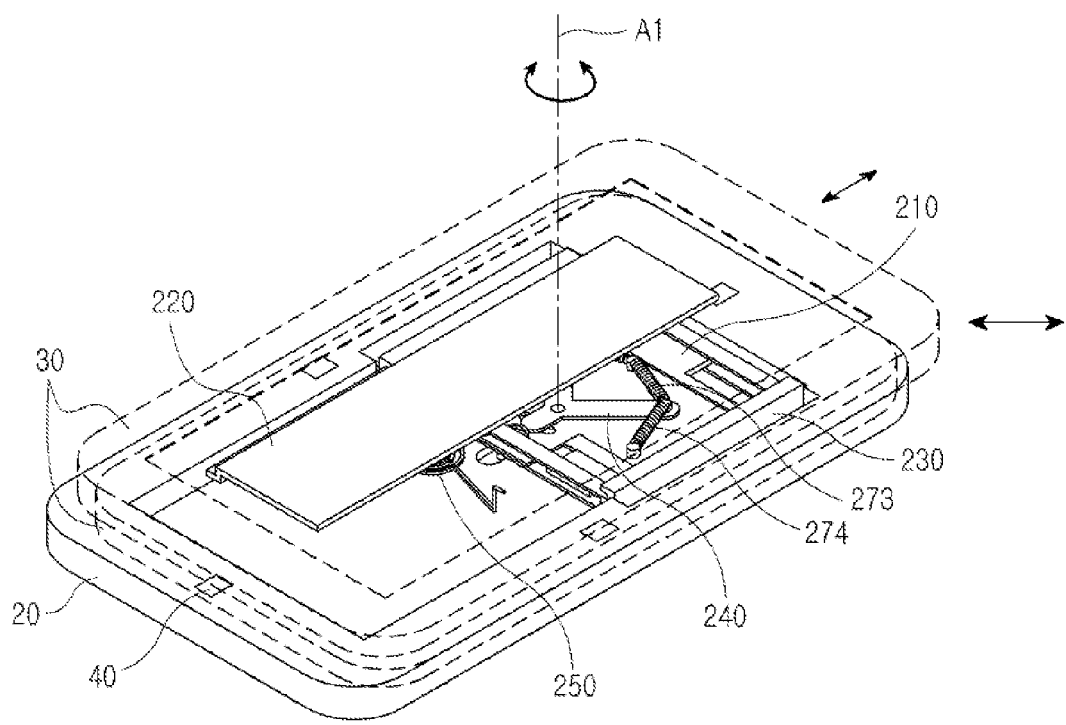
FIG. 20 is a perspective view of a portable electronic device according to an exemplary embodiment of the present invention when the sliding housing is moved upward or diagonally.
Figure 21:
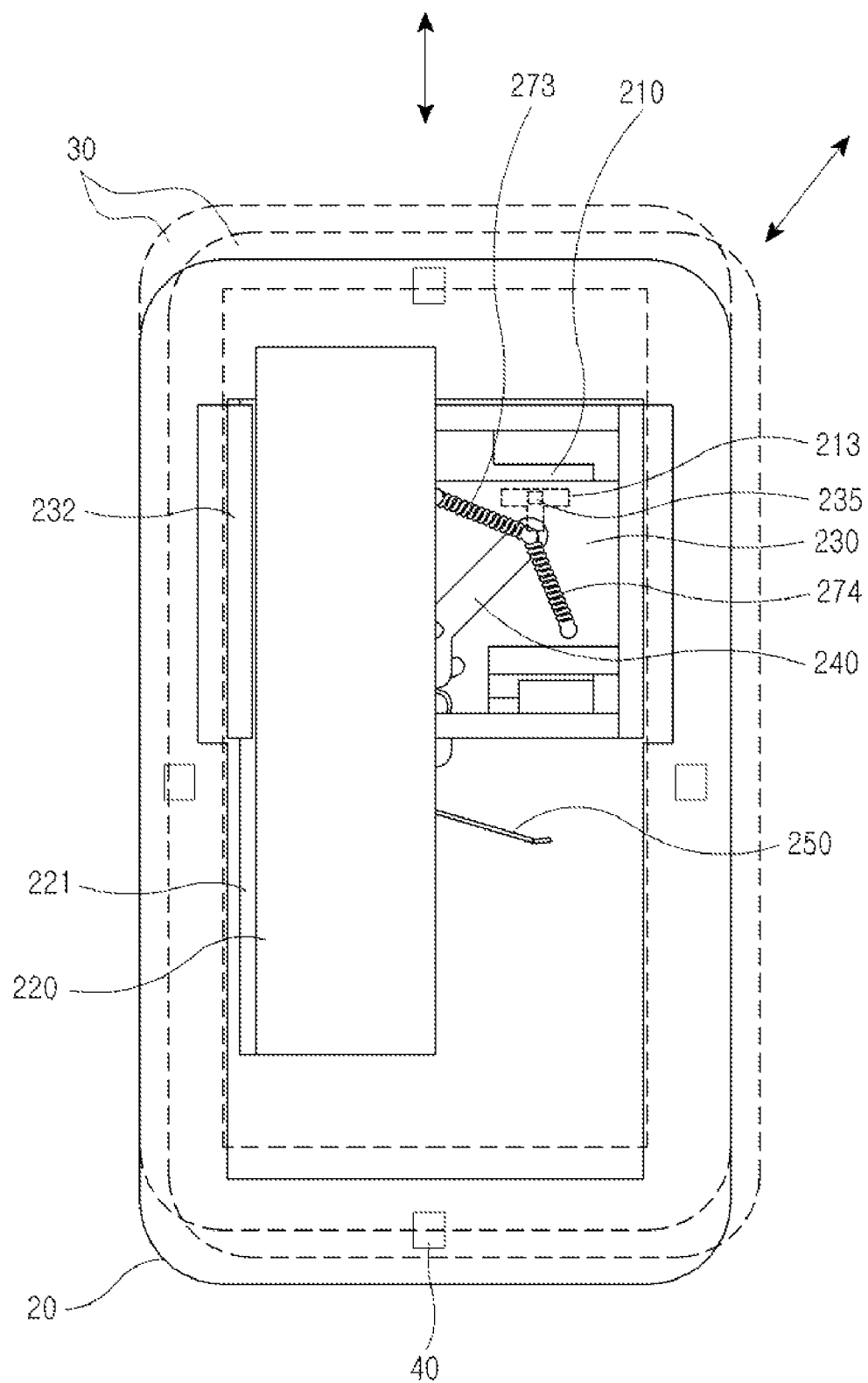
FIG. 21 is a front view of a portable electronic device according to an exemplary embodiment of the present invention when the sliding housing is moved upward or diagonally.
Figure 22:
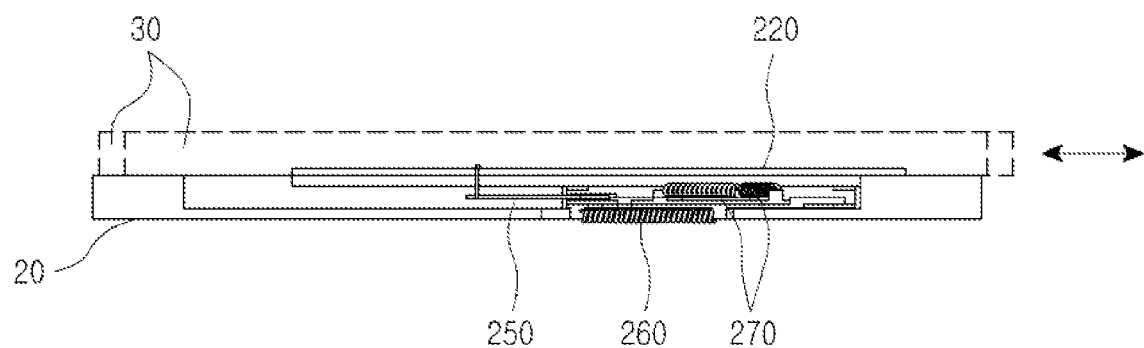
FIG. 22 is a lateral sectional view of a portable electronic device according to an exemplary embodiment of the present invention when the sliding housing is moved upward or diagonally.

As shown in FIGS. 20-22, when the user wants to provide an input to operate a corresponding character key, numeric key, game-dedicated key, volume key, channel switching key, navigation key, control key and the like provided by the sliding housing 30, the user slides the sliding housing 30 away from the main housing 20 in the upward direction or the diagonal direction.

As shown in FIGS. 20 and 21, the first sliding member 220 slides together with the sliding housing 30, and the guide rails 221 of the first sliding member 220 slide along the guide units 232 of the second sliding member 230 in the upward direction.

When the sliding housing 30 slides in the upward direction, a motion sensor 40, for example the motion sensor 40 on the upper side of the main housing 20, senses the movement, creates a corresponding signal, and applies the signal to the controller (not shown) which may be located in the main housing 20.

Depending on the input signal, the controller enables the user to provide an input to operate the corresponding character key, numeric key, game-dedicated key, volume key, channel switching key, navigation keys, control keys and the like.

If the user releases the sliding housing 30, as shown in FIGS. 21 and 22, it returns to its original location by means of the elastic force from the first elastic member 250. The sliding housing 30 and the main housing 20 stay facing each other.

If the user moves the sliding housing 30 away from the main housing 20 in the downward direction, as shown in FIGS. 23-26, a motion sensor 40, for example the motion sensor 40 on the lower side of the main housing 20, senses the movement, creates a corresponding signal, and applies the signal to the controller (not shown).

Depending on the input signal, the controller enables the user to provide an input to operate the corresponding character key, numeric key, game-dedicated key, volume key, channel switching key, navigation key, control key and the like.

Figure 23:
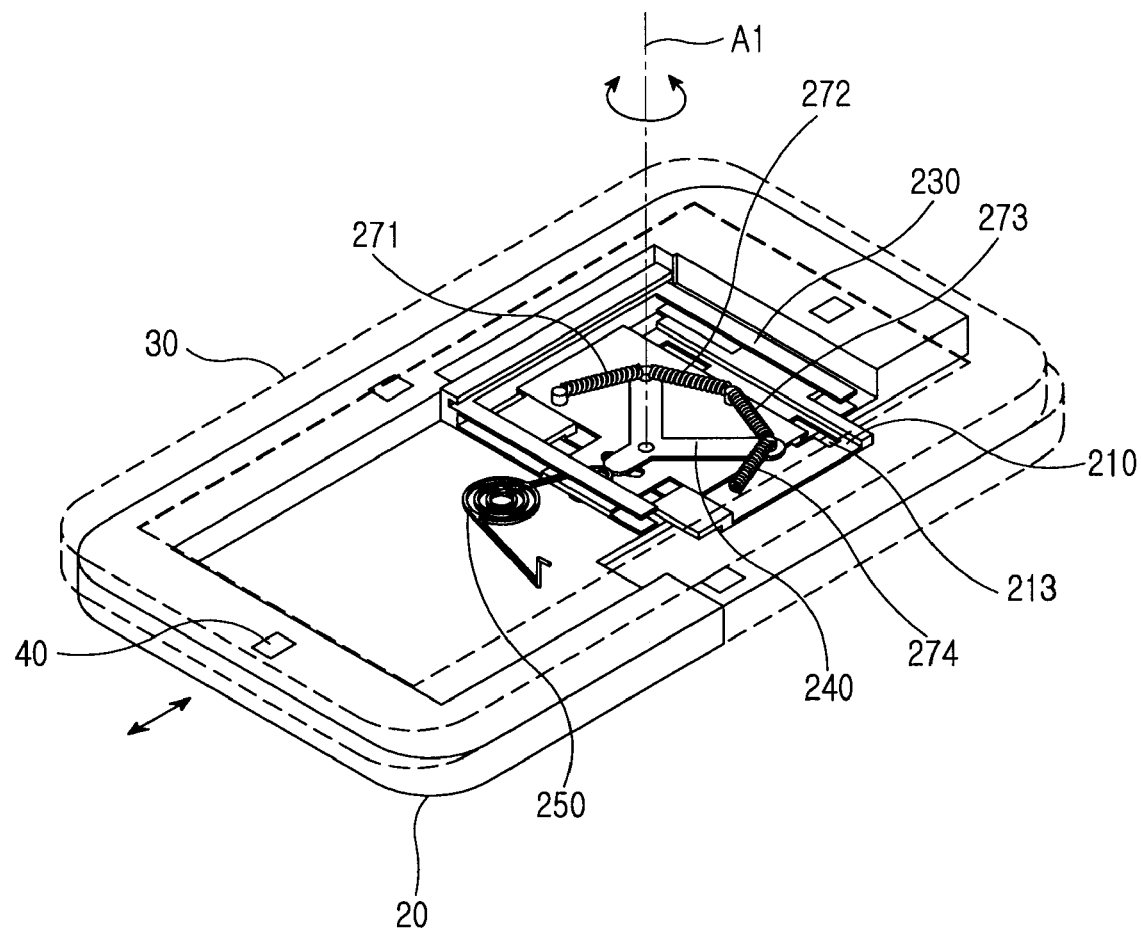
FIG. 23 is a perspective view of a portable electronic device according to an exemplary embodiment of the present invention when the sliding housing is moved downward.
Figure 24:
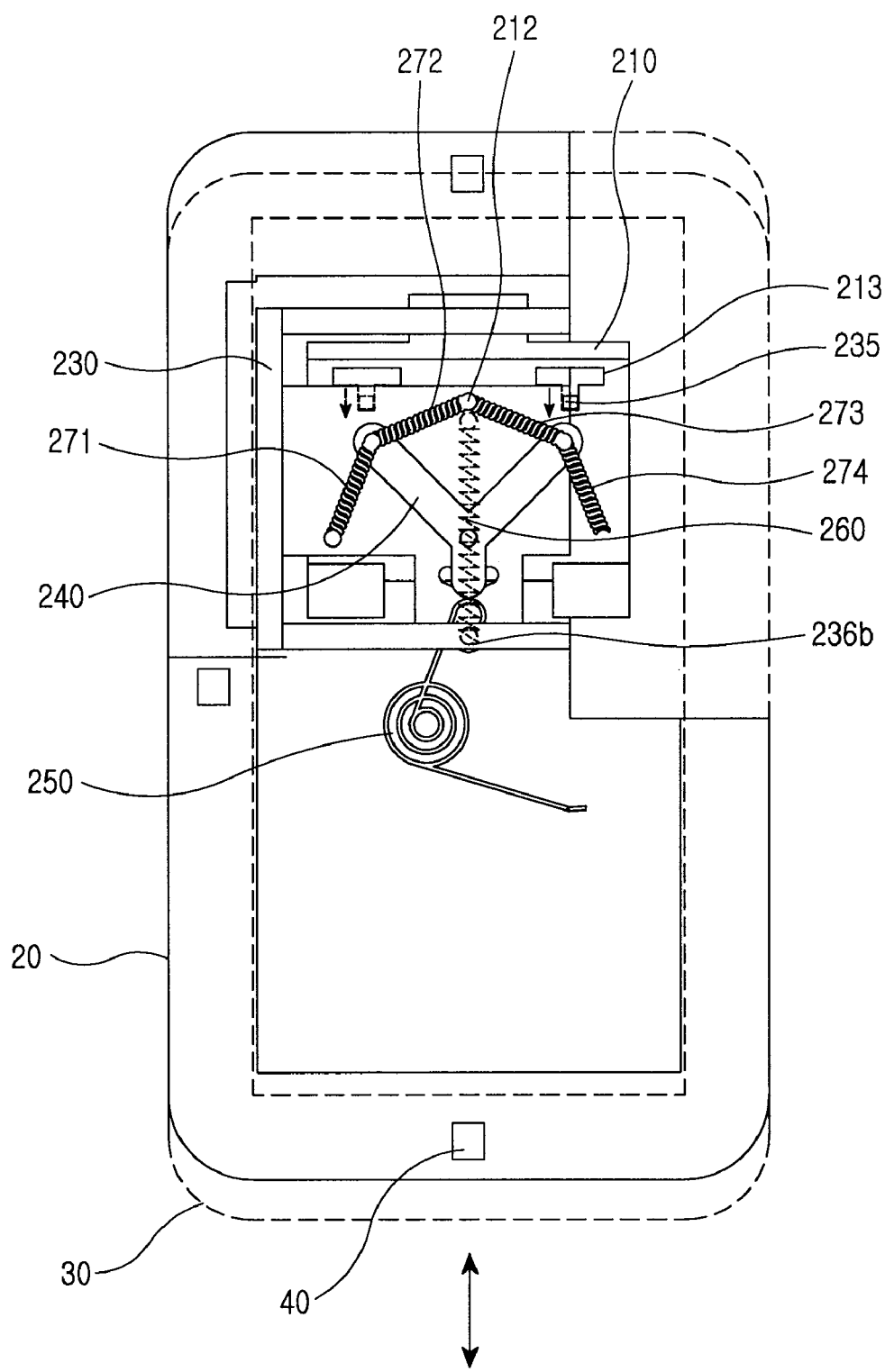
FIG. 24 is a front view of a portable electronic device according to an exemplary embodiment of the present invention when the sliding housing is moved downward.
Figure 25:
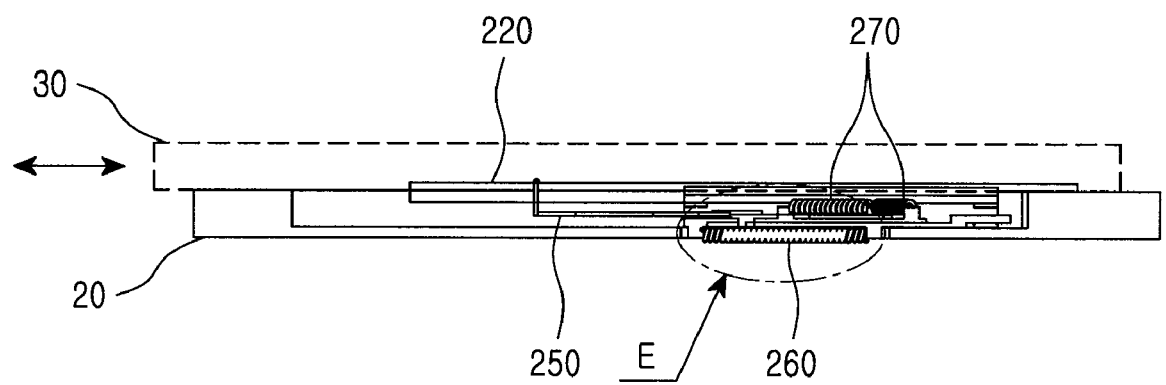
FIG. 25 is a lateral sectional view of a portable electronic device according to an exemplary embodiment of the present invention when the sliding housing is moved downward.
Figure 26:
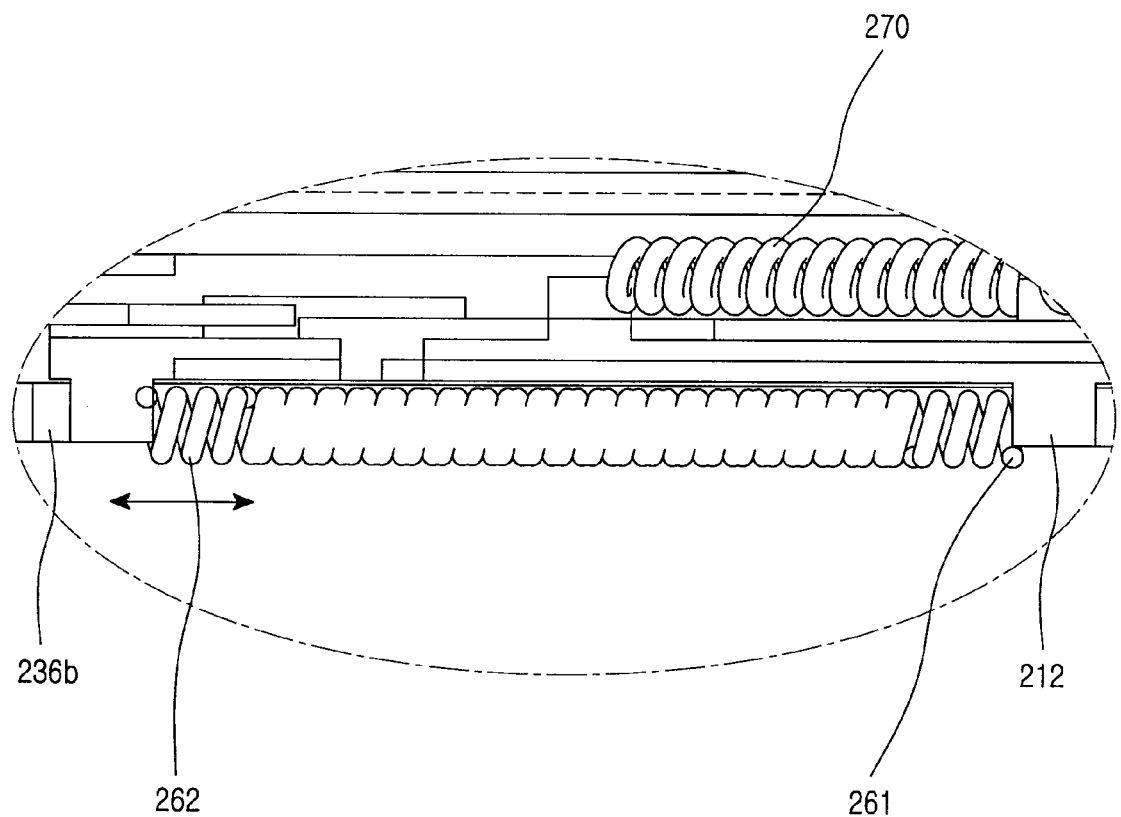
FIG. 26 is a lateral sectional view magnifying part E shown in FIG. 25.

When the first and second sliding members 220 and 230 slide together, as shown in FIGS. 23, 25, and 26, the second elastic fastener 236b of the second sliding member 230 moves accordingly, and the second elastic member 260, which is fastened to the second elastic fastener 236b, is extended.

The guide member 235 of the second sliding member 230 also moves in the downward direction while being guided along the guide movement hole 213 formed on the base member 210.

If the user releases the sliding housing 30, as shown in FIGS. 23-26, the sliding housing 30 returns to its original location. The second elastic member 260, which has been extended, is compressed again, and the resulting elastic force causes the first and second sliding members 220 and 230 to slide and return to their original locations. The guide member 235 also moves while being guided along the guide movement hole 213.

Figure 27:
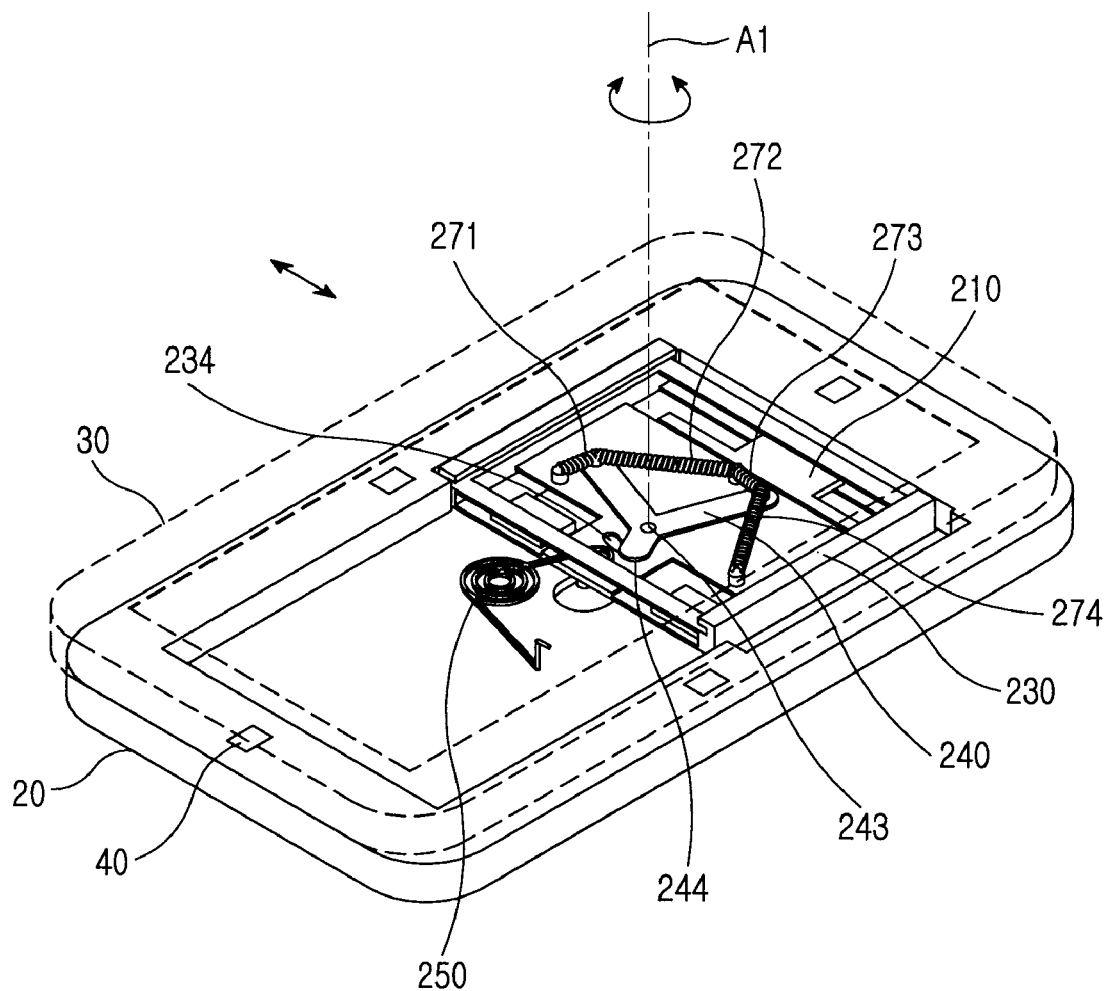
FIG. 27 is a perspective view of a portable electronic device according to an exemplary embodiment of the present invention when the sliding housing is moved leftward.
Figure 28:
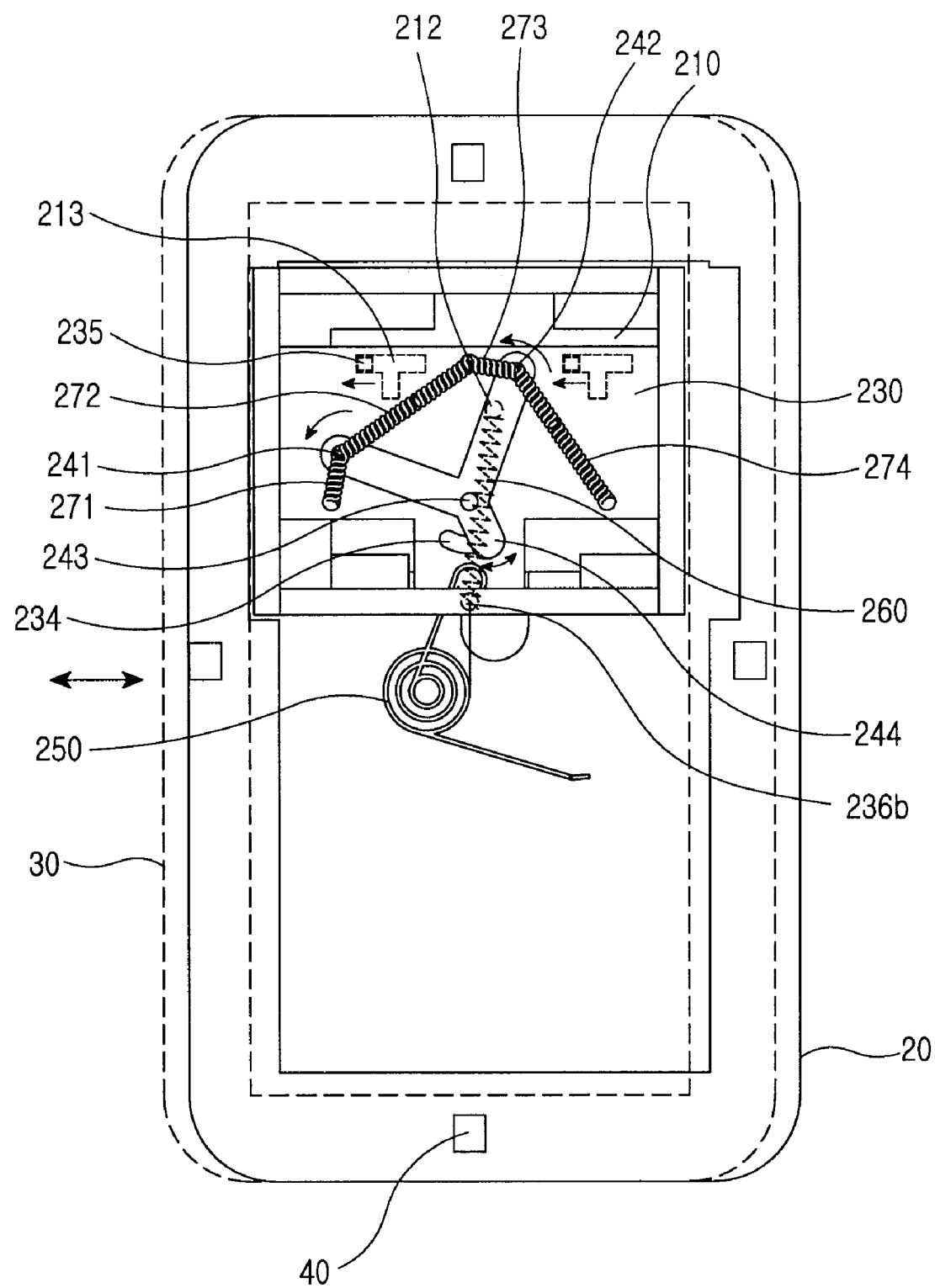
FIG. 28 is a top view of a portable electronic device according to an exemplary embodiment of the present invention when the sliding housing is moved leftward.

If the user moves the sliding housing 30 away from the main housing 20 in the leftward direction, as shown in FIGS. 27 and 28, a motion sensor 40, for example the motion sensor 40 on the left side of the main housing 20, senses the movement, creates a corresponding signal, and applies the signal to the controller (not shown).

Depending on the input signal, the controller enables the user to provide an input to operate the corresponding character key, numeric key, game-dedicated key, volume key, channel switching key, navigation key, control key and the like.

As shown in FIG. 28, if the sliding housing 30 moves in the leftward direction, the first and second sliding members 220 and 230 slide together. In addition, the link member 240 rotates in the leftward direction about the link axis A1.

The link member 240 has a Y-shaped configuration, and the first and second fastening protrusions are formed on respective ends of the Y-shaped link member 240.

The guide stopper 244 is formed on an end of the link member 240 lying opposite the ends of the link member 240, on which the first and second fastening protrusions 241 and 242 are formed, about the coupling hole 243 formed at the center of the link member 240. Therefore, the first and second fastening protrusions 241 and 242 rotate in the leftward direction, while the guide stopper 244 rotates in the rightward direction.

In other words, the link member 240 has a Y-shaped configuration, and the first and second fastening protrusions are formed on respective ends of the link member 240 lying opposite the end of the link member 240 on which the guide stopper 244 is formed.

As shown in FIGS. 27 and 28, the guide stopper 244 limits the rotation as it is guided and moved by the rotation guide unit 234. The guide member 235 of the second sliding member 230 moves in the leftward direction along the guide movement hole 213 of the base member 210.

As shown in FIG. 28, when the first and second fastening protrusions 241 and 242 rotate in the leftward direction, they compress the first coil spring 271 positioned between the third elastic fastener 236c and the first fastening protrusion 241 and extend the second coil spring 272 positioned between the first fastening protrusion 241 and the fourth elastic fastener 236d. In addition, the third coil spring 273 between the fourth elastic fastener 236d and the second fastening protrusion 242 is compressed, while the fourth coil spring 274 between the second fastening protrusion 242 and the fifth elastic fastener 236e is extended.

One end 261 of the second elastic member 260 is fastened to the elastic fastener 212 of the base member 210, and the other end 262 is fastened to the second elastic fastener 236b. Therefore, when the second sliding member 230 moves in the leftward direction, the second elastic fastener 236b of the second sliding member 230 moves together in the leftward direction and extends the second elastic member 260.

If the user releases the sliding housing 30, it returns to its original location on the main housing 20.

The first and second sliding members 220 and 230 also return to their original locations, and the link member 240 rotates about the link axis A1 and returns to its original location.

As shown in FIGS. 27 and 28, the first and second fastening protrusions 241 and 242 of the link member 240 are rotated from the left to the right by the third elastic members 270, which include the first, second, third, and fourth coil springs 271, 272, 273, and 274, respectively. The first coil spring between the third elastic fastener 236c and the first fastening protrusion 241 is extended again after it has been compressed. The second coil spring 272 between the first fastening protrusion 241 and the fourth elastic fastener 236d is compressed again after it has been extended. The third coil spring 273 between the fourth elastic fastener 236d and the second fastening protrusion 242 is extended again after it has been compressed. The fourth coil spring 274 between the second fastening protrusion 242 and the fifth elastic fastener 236e returns to its original location after it has been extended.

The second elastic member 260, which has been extended, slides the second elastic fastener 236b of the second sliding member 230 from the left to the right.

The guide stopper 244 is guided and moved by the rotation guide unit 234 until it returns to its original location. The guide member 235 of the second sliding member 230 also moves from the left to the right along the guide movement hole 213 of the base member 210 until it returns to its original location.

Figure 29:
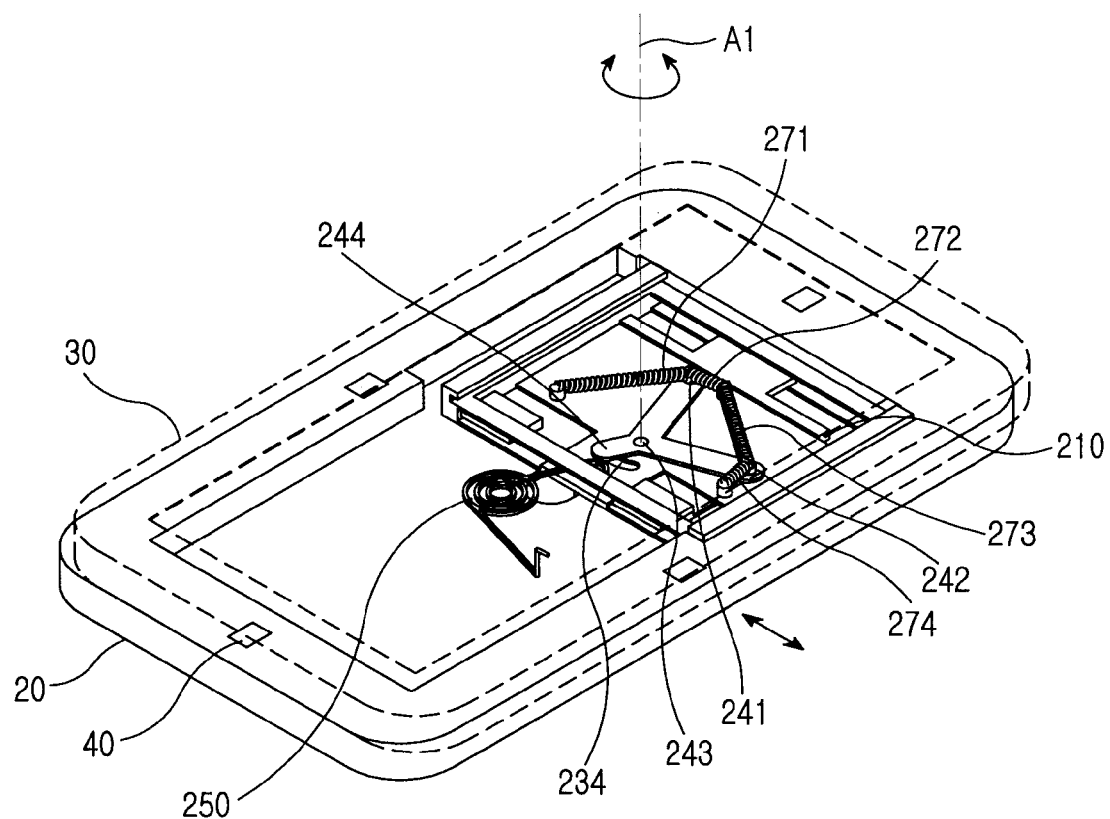
FIG. 29 is a perspective view of a portable electronic device according to an exemplary embodiment of the present invention when the sliding housing is moved rightward.
Figure 30:
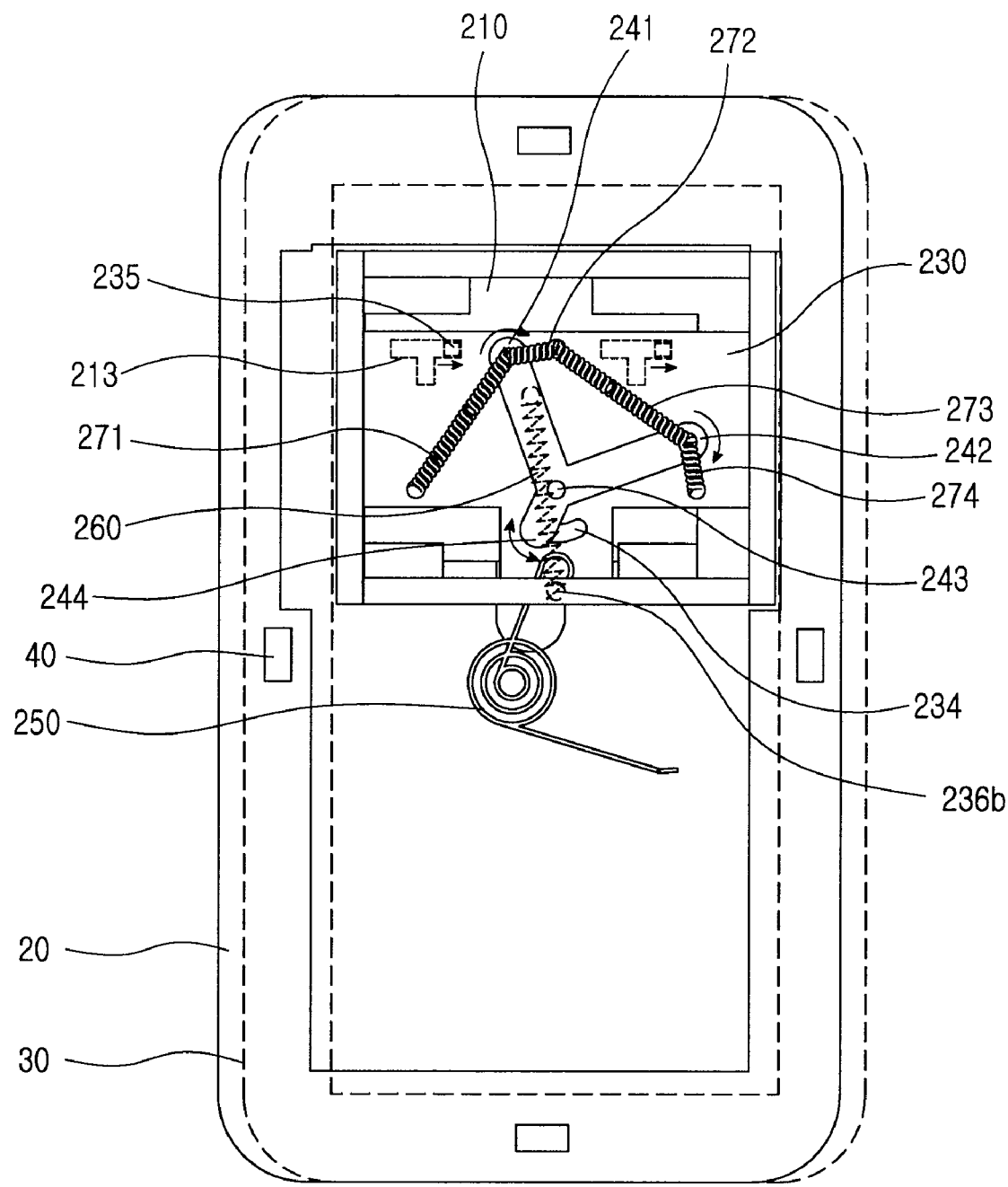
FIG. 30 is a top view of a portable electronic device according to an exemplary embodiment of the present invention when the sliding housing is moved rightward.

As shown in FIGS. 29 and 30, if the user moves the sliding housing 30 away from the main housing 20 in the rightward direction, a motion sensor 40, for example the motion sensor 40 on the right side of the main housing 20, senses the movement, creates a corresponding signal, and applies the signal to the controller (not shown).

Depending on the input signal, the controller enables the user to provide an input to operate the corresponding character key, numeric key, game-dedicated key, volume key, channel switching key, navigation key, control key and the like.

As shown in FIG. 30, when the sliding housing 30 moves in the rightward direction, the first and second sliding members 220 and 230 slide together, and the link member 240 rotates in the rightward direction about the link axis A1.

The first and second fastening protrusions 241 and 242 rotate in the rightward direction, while the guide stopper 244 rotates in the leftward direction. That is, because the guide stopper 244 is formed on an end of the link member 240 lying opposite the ends of the link member 240 on which the first and second fastening protrusions 241 and 242 are formed, and because the coupling hole 243 is formed at the center of the link member 240, the first and second fastening protrusions 241 and 242 rotate in the rightward direction, while the guide stopper 244 rotate in the leftward direction.

The guide stopper 244 limits the rotation of the link member 240 because it is guided and moved by the rotation guide unit 234. The guide member 235 of the second sliding member 230 moves in the rightward direction along the guide movement hole 213 of the base member 210.

As shown in FIG. 30, when the first and second fastening protrusions 241 and 242 rotate in the rightward direction, they extend the first coil spring 271 positioned between the third elastic fastener 236c and the first fastening protrusion 241 and compress the second coil spring 272 positioned between the first fastening protrusion 241 and the fourth elastic fastener 236d. In addition, the third coil spring 273 between the fourth elastic fastener 236d and the second fastening protrusion 242 is extended, while the fourth coil spring 274 between the second fastening protrusion 242 and the fifth elastic fastener 236e is compressed.

When the second sliding member 230 moves in the rightward direction, the second elastic fastener 236b of the second sliding member 230 moves together in the rightward direction and extends the second elastic member 260.

If the user releases the sliding housing 30, it returns to its original location on the main housing 20.

The first and second sliding members 220 and 230 also return to their original locations, and the link member 240 rotates about the link axis A1 and returns to its original location.

As shown in FIG. 30, the first and second fastening protrusions 241 and 242 of the link member 240 are rotated from the right to the left by the third elastic members 270, which include the first, second, third, and fourth coil springs 271, 272, 273, and 274, respectively. The first coil spring 271 between the third elastic fastener 236c and the first fastening protrusion 241 is compressed again after it has been extended. The second coil spring 272 between the first fastening protrusion 241 and the fourth elastic fastener 236d is extended again after it has been compressed. The third coil spring 273 between the fourth elastic fastener 236d and the second fastening protrusion 242 is compressed again after it has been extended. The fourth coil spring 274 between the second fastening protrusion 242 and the fifth elastic fastener 236e is extended again after it has been compressed.

The second elastic member 260, which has been extended, slides the second elastic fastener 236b of the second sliding member 230 from the right to the left until it returns to its original location.

The guide stopper 244 is guided and moved by the rotation guide unit 234 until it returns to its original location. The guide member 235 of the second sliding member 230 also moves from the right to the left along the guide movement hole 213 of the base member 210 until it returns to its original location.

A procedure of operating a sliding device of a key input device for a portable electronic device according to another exemplary embodiment of the present invention will now be described in more detail with reference to FIGS. 31-40.

Figure 31:
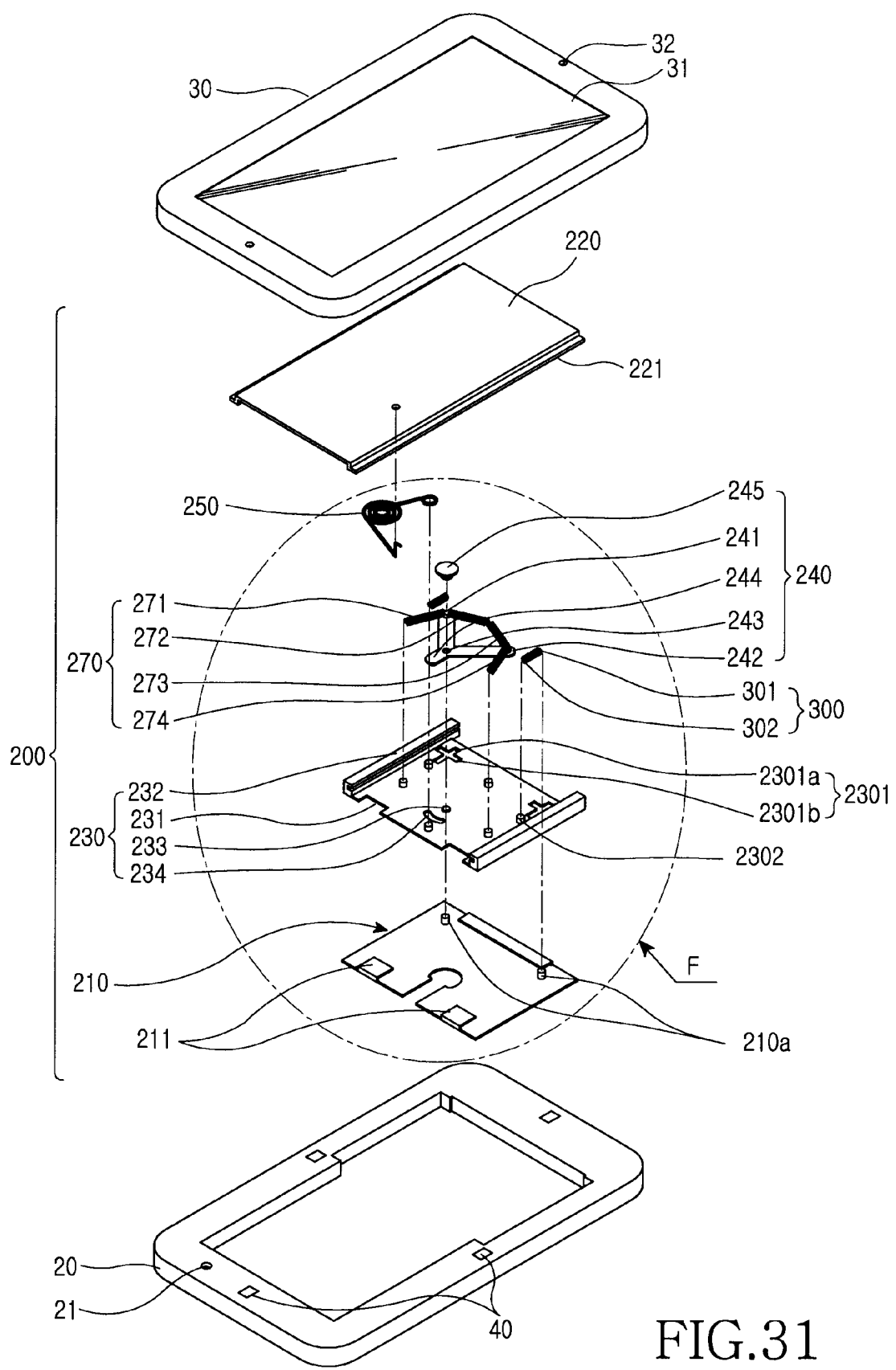
FIG. 31 is an exploded perspective view of a portable electronic device according to an exemplary embodiment of the present invention.
Figure 32:
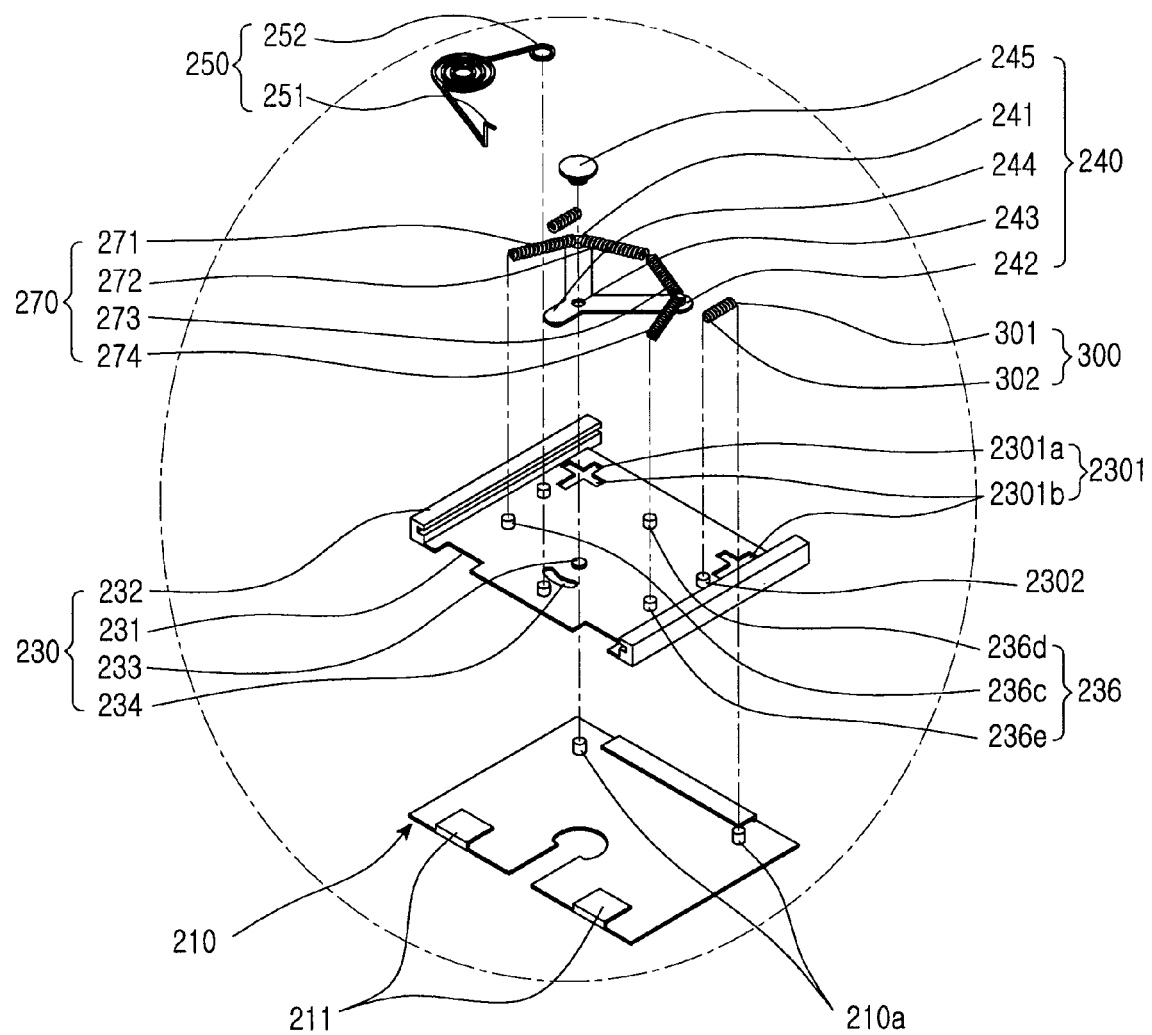
FIG. 32 is an exploded perspective view magnifying part F shown in FIG. 31.

As shown in FIGS. 31 and 32, the sliding device 200 of the key input device 10 for a portable electronic device includes a main housing 20, a sliding housing 30, at least one motion sensor 40, a base member 210, first and second sliding members 220 and 230, a link member 240, first and third elastic members 250 and 270, and at least one fourth elastic member 300. The first and second sliding members 220 and 230 are stacked on the base member 210 so that the sliding housing 30 can slide away from the main housing 20 in the upward, downward, leftward, or rightward direction. The link member 240 is rotatably coupled to the first and second sliding members 220 and 230 so that, when the link member 240 rotates about a link axis A1, the sliding housing 30 can slide in the leftward or rightward direction. The first and third elastic members 250 and 270 are positioned between the first and second sliding members 220 and 230 to provide elastic force necessary for sliding movements of the first and second sliding members 220 and 230.

As shown in FIG. 32, the fourth elastic members 300 are positioned on the second sliding member 230 to provide an additional elastic force necessary for sliding movements of the first and second sliding members 220 and 230 in the downward and leftward/rightward directions. The fourth elastic members 300 include at least one spring, one end 301 of which is fastened to an elastic fastener 210a formed on the base member 210, and the other end 302 of the spring 300 is fastened to an elastic fastener 2302 formed on the second sliding member 230.

The elastic fasteners 210a of the base member 210 extend through and are coupled to at least one guide locking unit 2301 formed on the second sliding member 230.

As shown in FIGS. 31 and 32, the guide locking units 2301 have a "+"-shaped configuration. Particularly, the guide locking units 2301 include first locking holes 2301a adapted to move together and engage with or disengage from the elastic fasteners 210a of the base member 210, when the first and second sliding members 220 and 230 slide in the downward direction, in order to limit the sliding movements of the first and second sliding members 220 and 230 in the leftward/rightward direction.

The guide locking units 2301 also include second locking holes 2301b positioned adjacent to the first locking holes 2301a and adapted to move together and engage with or disengage from the elastic fasteners 210a of the base member 210, when the first and second sliding members 220 and 230 slide in the leftward/rightward direction, in order to limit the sliding movements of the first and second sliding members 220 and 230 in the upward/downward direction.

The link member 240 is rotatably coupled inside the second sliding member 230. A link coupling protrusion 245 extends through a coupling hole 243 formed at the center of the link member 240, as well as through a rotation unit 233 formed on the second sliding member 230, for the rotatable coupling.

Figure 33:
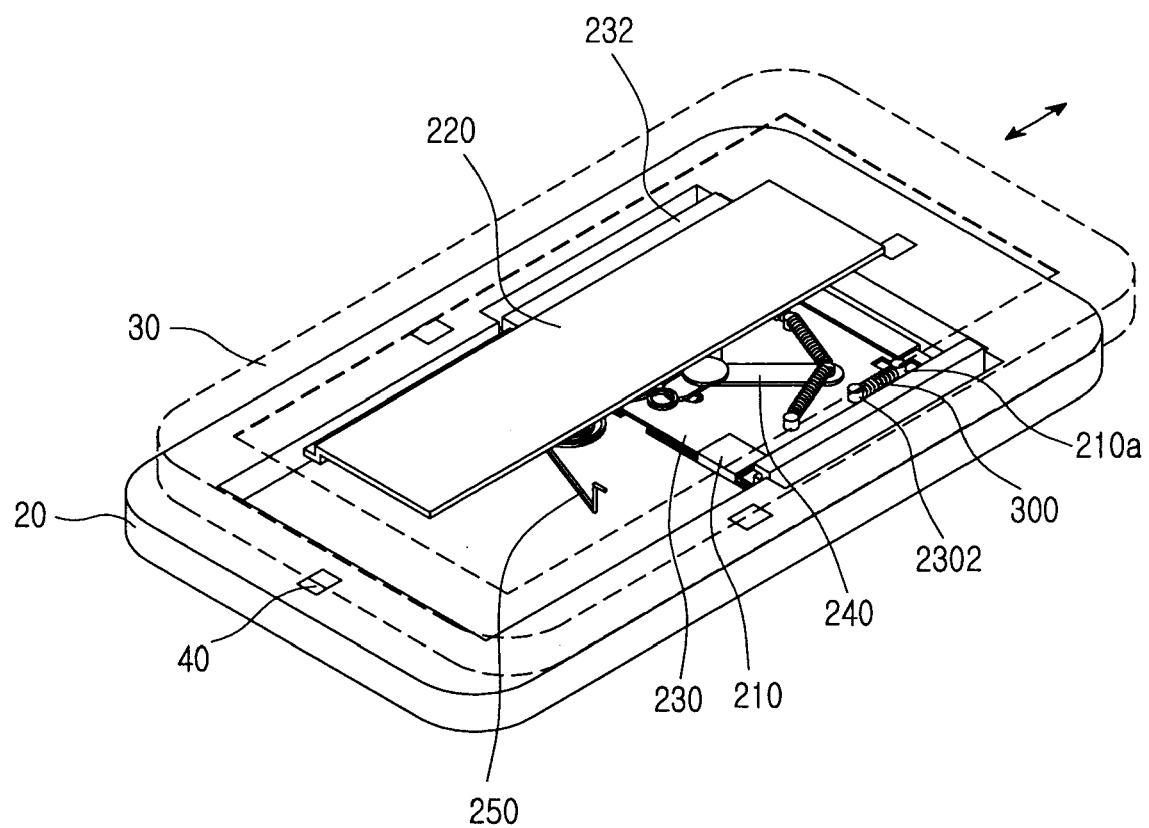
FIG. 33 is a perspective view of a portable electronic device according to an exemplary embodiment of the present invention when the sliding housing is moved upward.
Figure 34:
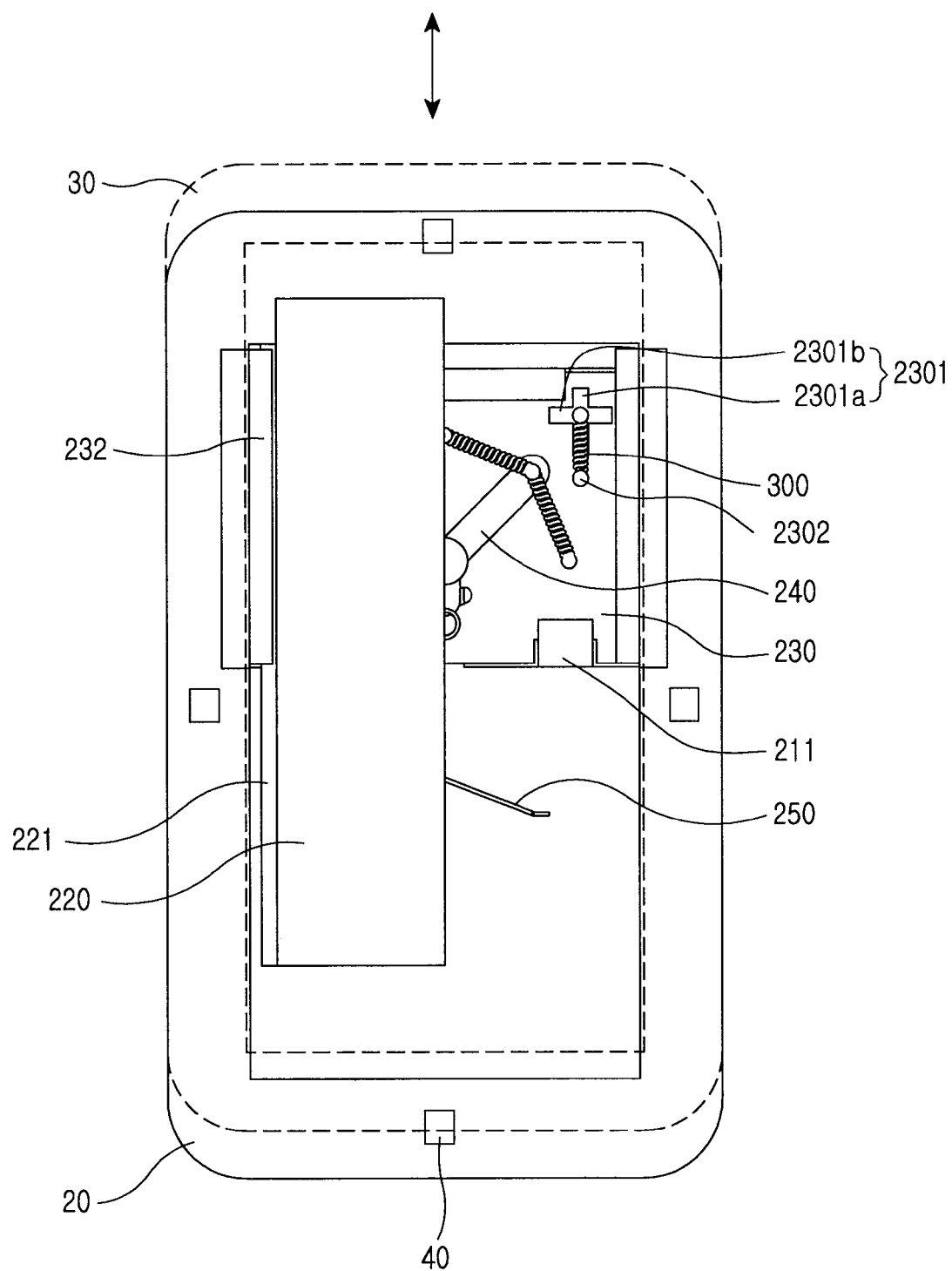
FIG. 34 is a front view of a portable electronic device according to an exemplary embodiment of the present invention when the sliding housing is moved upward.

As shown in FIGS. 33 and 34, when the user wants to provide an input to operate a character key, a numeric key, a game-dedicated key, a volume key, a channel switching key, a navigation key, a control key and the like provided by the sliding housing 30, the user slides the sliding housing 30 away from the main housing 20 in the upward direction.

As shown in FIG. 34, the first sliding member 220 slides together with the sliding housing 30 and the guide rib 221 of the first sliding member 220 slides along the guide unit 232 of the second sliding member 230 in the upward direction.

When the sliding housing 30 slides in the upward direction, a motion sensor 40, for example the motion sensor 40 on the upper side of the main housing 20, senses the movement, creates a corresponding signal, and applies the signal to the controller (not shown). In an exemplary implementation, the controller is located in the main housing 20.

Depending on the input signal, the controller enables the user to provide an input to operate the corresponding character key, numeric key, game-dedicated key, volume key, channel switching key, navigation key, control key and the like.

As shown in FIGS. 33 and 34, if the user releases the sliding housing 30, it returns to its original location by means of the elastic force from the first elastic member 250. The sliding housing 30 and the main housing 20 remain facing each other.

Figure 35:
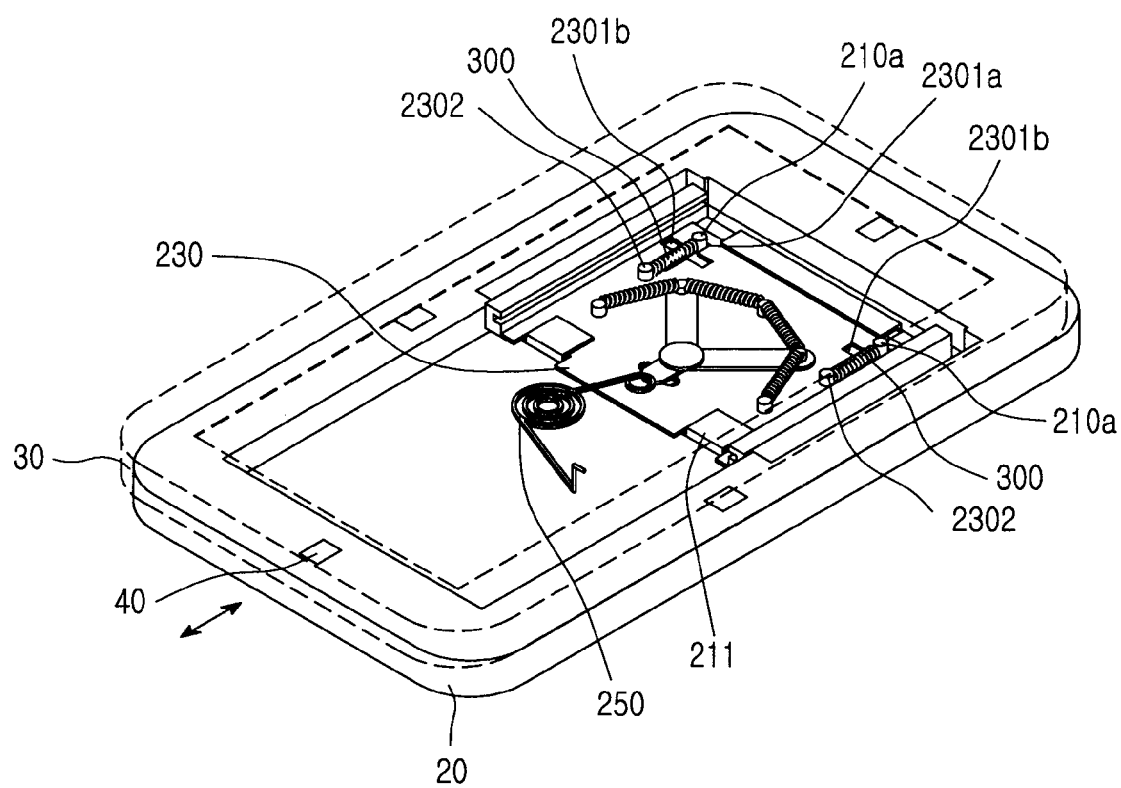
FIG. 35 is a perspective view of a portable electronic device according to an exemplary embodiment of the present invention when the sliding housing is moved downward.
Figure 36:
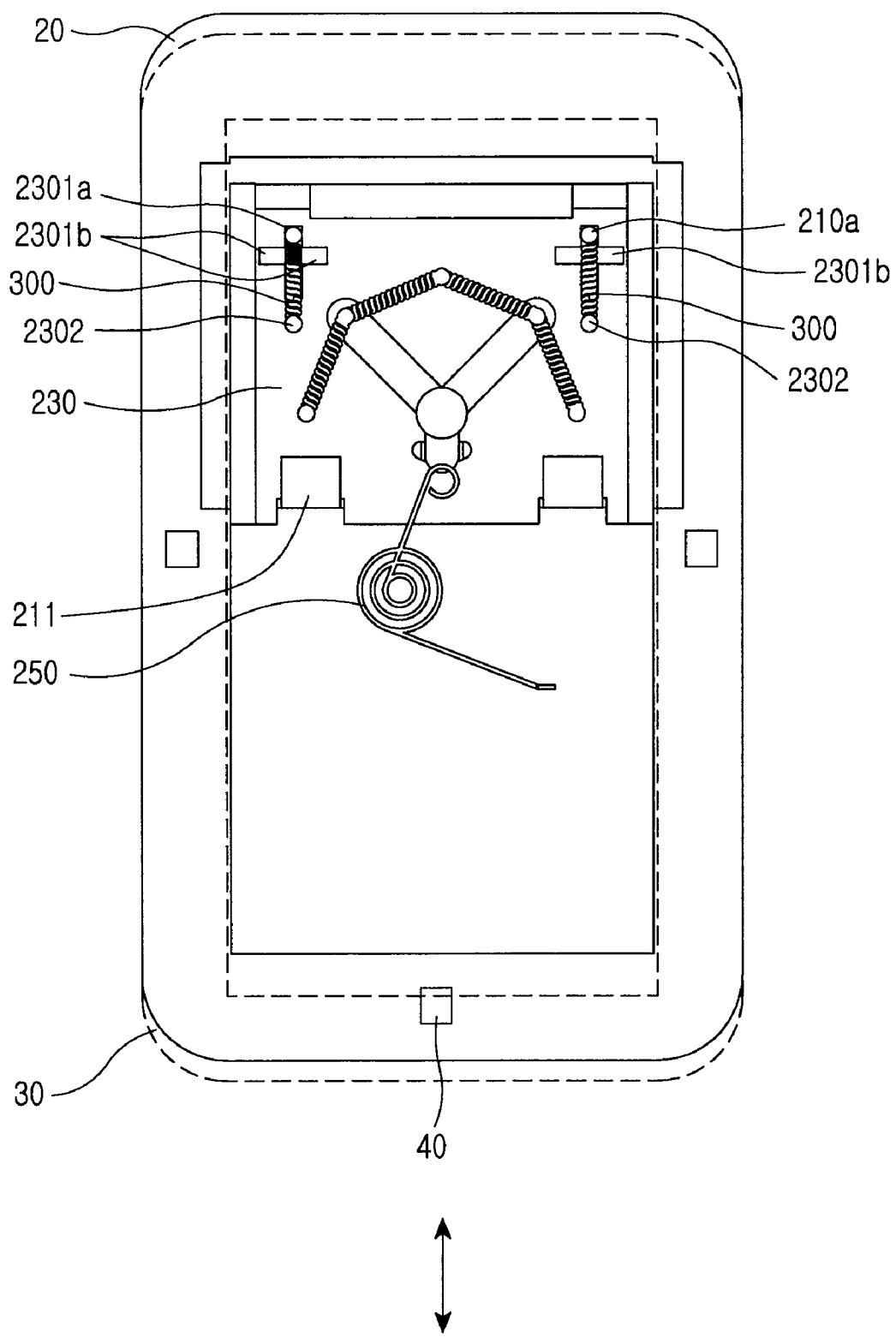
FIG. 36 is a front view of a portable electronic device according to an exemplary embodiment of the present invention when the sliding housing is moved downward.

When the user slides the sliding housing 30 away from the main housing 20 in the downward direction, as shown in FIGS. 35 and 36, a motion sensor 40, for example the motion sensor 40 on the lower side of the main housing 20 senses the movement, creates a corresponding signal, and applies the signal to the controller (not shown).

Depending on the input signal, the controller enables the user to provide an input to operate the corresponding character key, numeric key, game-dedicated key, volume key, channel switching key, navigation key, control key and the like.

As shown in FIGS. 35 and 36, the first and second sliding members 220 and 230 slide together, and the elastic fasteners 2302 of the second sliding member 230 also move. The fourth elastic members 300 fastened to the elastic fasteners 2302 are then extended.

The guide locking units 2301 of the second sliding member 230 also move in the downward direction, and are coupled to the elastic fasteners 210a formed on the base member 210. The elastic fasteners 210a of the base member 210 are coupled to the first locking holes 2301a of the guide locking units 2301, which then limit the sliding movements of the first and second sliding members 220 and 230 in the leftward/rightward direction.

If the user releases the sliding housing 30, as shown in FIGS. 35 and 36, the sliding housing 30 returns to its original location. The first and second sliding members 220 and 230 also slide and return to their original locations by means of the elastic force from the fourth elastic members 300 which are compressed after having been extended. The first locking holes 2301a of the guide locking units 2301 also move together and disengage from the elastic fasteners 210a of the base member 210. As a result, the guide locking units 2301 are unlocked from the base member 210.

Figure 37:
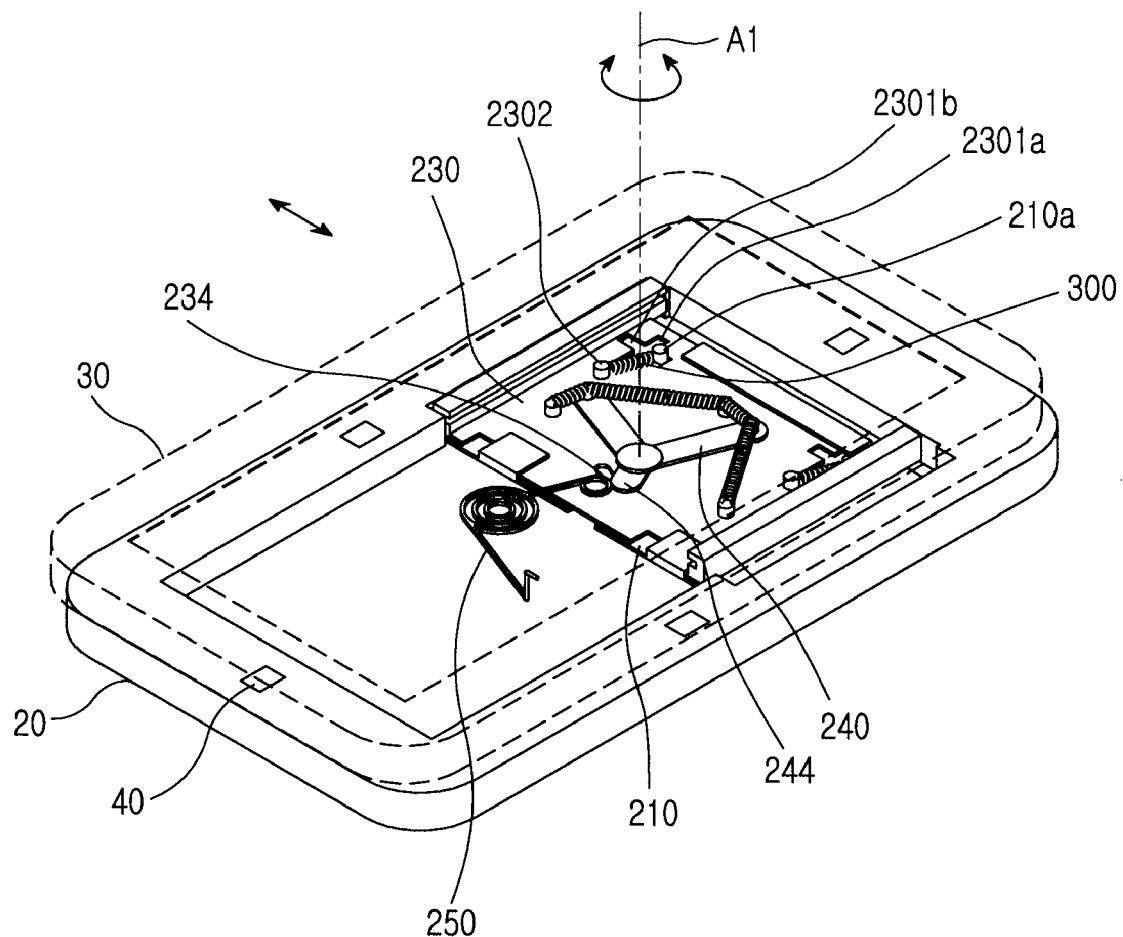
FIG. 37 is a perspective view of a portable electronic device according to an exemplary embodiment of the present invention when the sliding housing is moved leftward.
Figure 38:
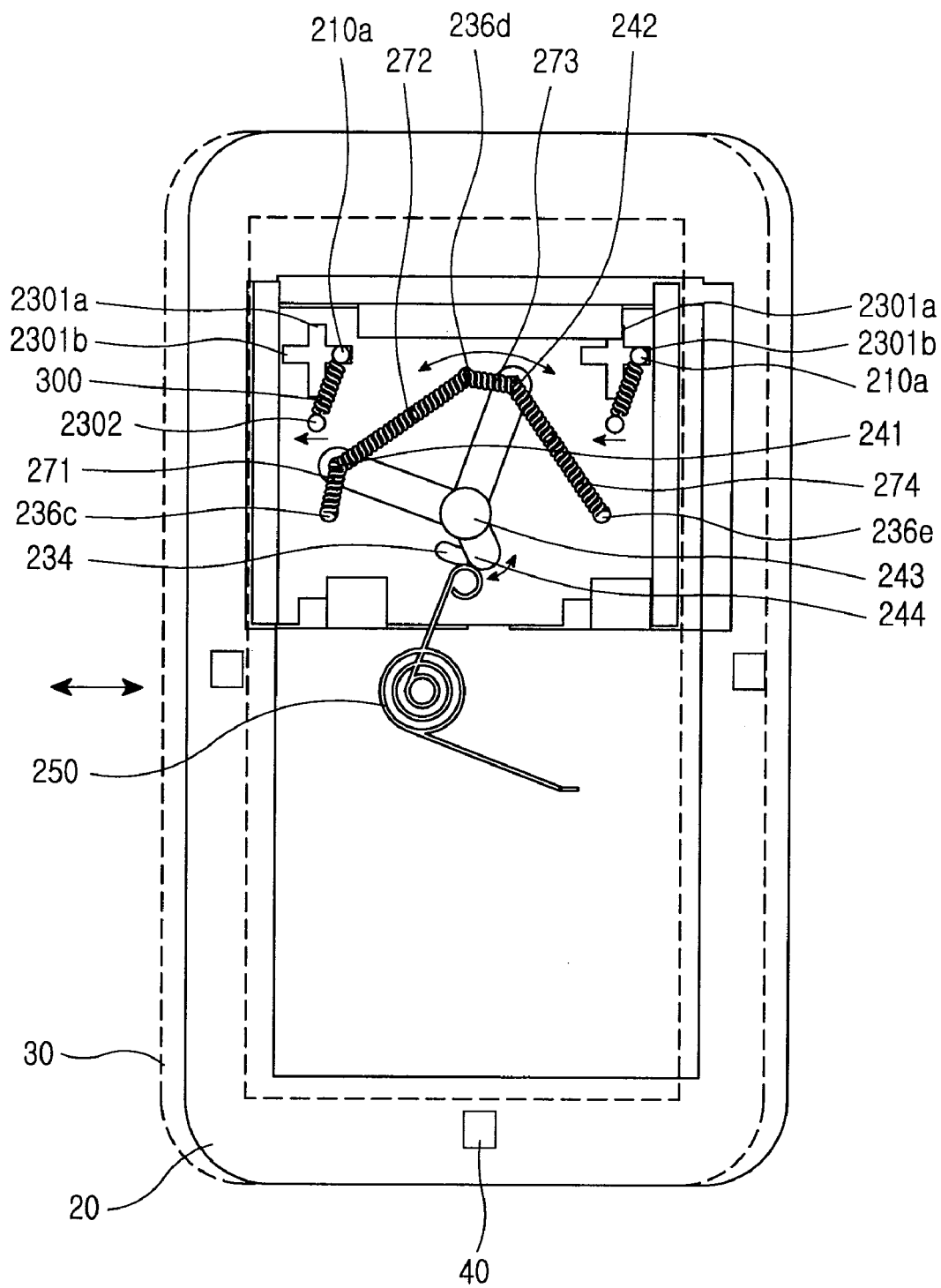
FIG. 38 is a top view of a portable electronic device according to an exemplary embodiment of the present invention when the sliding housing is moved leftward.

When the user slides the sliding housing 30 away from the main housing 20 in the leftward direction, as shown in FIGS. 37 and 38, a motion sensor 40, for example the motion sensor 40 on the left side of the main housing 20, senses the movement, creates a corresponding signal, and applies the signal to the controller (not shown).

Depending on the input signal, the controller enables the user to provide an input to operate the corresponding character key, numeric key, game-dedicated key, volume key, channel switching key, navigation key, control key and the like.

As shown in FIG. 38, if the sliding housing 30 moves in the leftward direction, the first and second sliding members 220 and 230 slide together. In addition, the link member 240 rotates in the leftward direction about the link axis A1.

The guide stopper 244 is formed on an end of the link member 240 lying opposite the ends of the link member 240, on which the first and second fastening protrusions 241 and 242 are formed, about the coupling hole 243 formed at the center of the link member 240. Therefore, the first and second fastening protrusions 241 and 242 rotate in the leftward direction, while the guide stopper 244 rotates in the rightward direction.

In other words, the link member 240 has a Y-shaped configuration, and the first and second fastening protrusions are formed on respective ends of the link member 240 lying opposite the end of the link member 240 on which the guide stopper 244 is formed.

As shown in FIGS. 37 and 38, the guide stopper 244 limits the rotation as it is guided and moved by the rotation guide unit 234.

As shown in FIG. 38, when the first and second fastening protrusions 241 and 242 rotate in the leftward direction, they compress the first coil spring 271 positioned between the third elastic fastener 236c and the first fastening protrusion 241 and extend the second coil spring 272 positioned between the first fastening protrusion 241 and the fourth elastic fastener 236d. In addition, the third coil spring 273 between the fourth elastic fastener 236d and the second fastening protrusion 242 is compressed, while the fourth coil spring 274 between the second fastening protrusion 242 and the fifth elastic fastener 236e is extended.

As shown in FIG. 38, one end 301 of the fourth elastic member 300 is fastened to the elastic fastener 210a of the base member 210, and the other end 302 is fastened to the elastic fastener 2302 of the second sliding member 230 so that, when the second sliding member 230 moves in the leftward direction, the elastic fastener 2302 of the second sliding member 230 moves together in the leftward direction and extends the fourth elastic member 300.

The guide locking unit 2301 of the second sliding member 230 also moves in the leftward direction, and the second locking unit 2301b of the guide locking unit 2301 moves together to be coupled to the elastic fastener 210a of the base member 210. The guide locking unit 2301 is locked onto the base member 210 and limits the sliding movements of the first and second sliding members 220 and 230 in the upward/downward direction.

If the user releases the sliding housing 30, it returns to its original location on the main housing 20.

The first and second sliding members 220 and 230 also return to their original locations, and the link member 240 rotates about the link axis A1 until it returns to its original location.

As shown in FIGS. 37 and 38, the first and second fastening protrusions 241 and 242 of the link member 240 are rotated from the left to the right by the third elastic members 270, which include the first, second, third, and fourth coil springs 271, 272, 273, and 274, respectively. The first coil spring between the third elastic fastener 236c and the first fastening protrusion 241 is extended again after it has been compressed. The second coil spring 272 between the first fastening protrusion 241 and the fourth elastic fastener 236d is compressed again after it has been extended. The third coil spring 273 between the fourth elastic fastener 236d and the second fastening protrusion 242 is extended again after it has been compressed. The fourth coil spring 274 between the second fastening protrusion 242 and the fifth elastic fastener 236e returns to its original location after it has been extended.

As shown in FIG. 38, the fourth elastic members 300, which have been extended, are compressed and slide the elastic fasteners 2302 of the second sliding member 230 from the left to the right.

The guide locking units 2301 also move from the left to the right, and the second locking holes 2301b of the guide locking units 2301 disengage from the elastic fasteners 210a of the base member 210 and return to their original locations. As a result, the guide locking units 2301 are unlocked from the base member 210.

Figure 39:
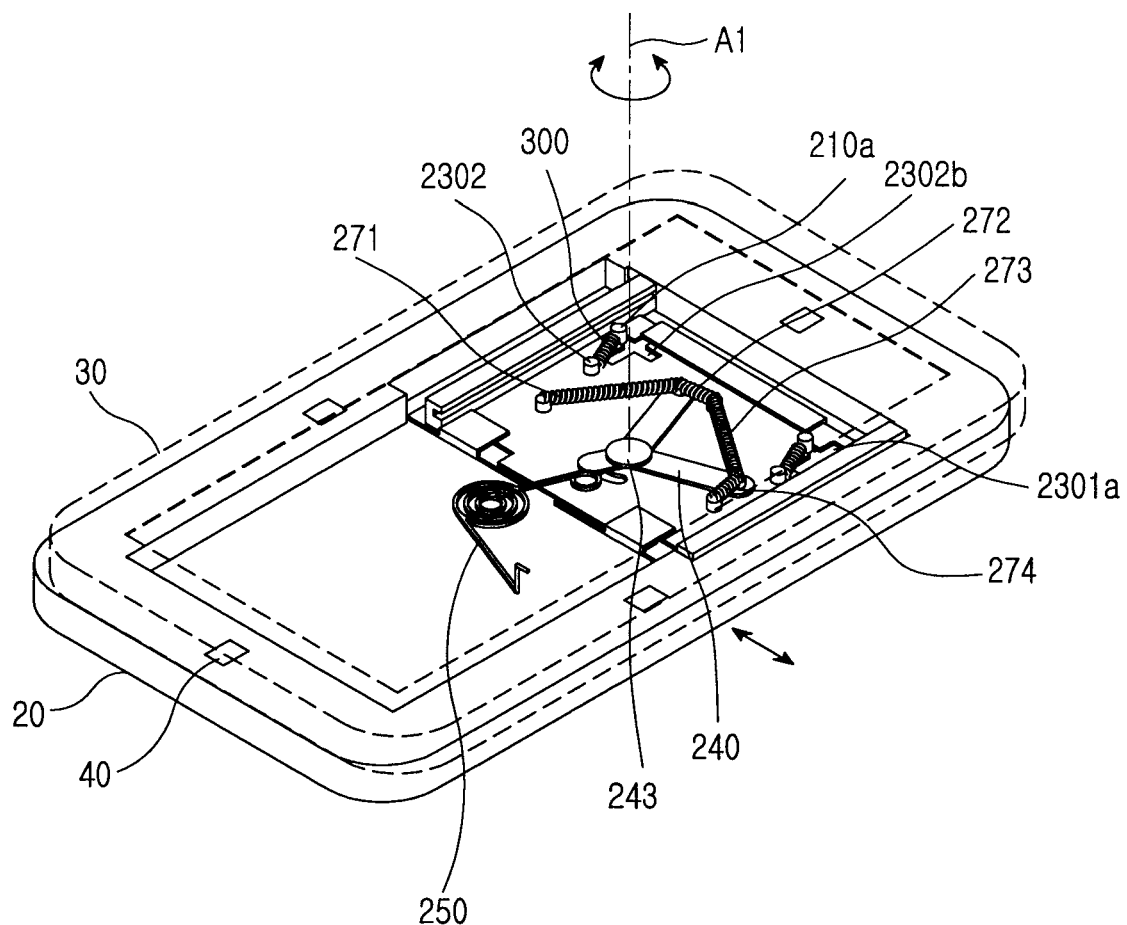
FIG. 39 is a perspective view of a portable electronic device according to an exemplary embodiment of the present invention when the sliding housing is moved rightward.
Figure 40:
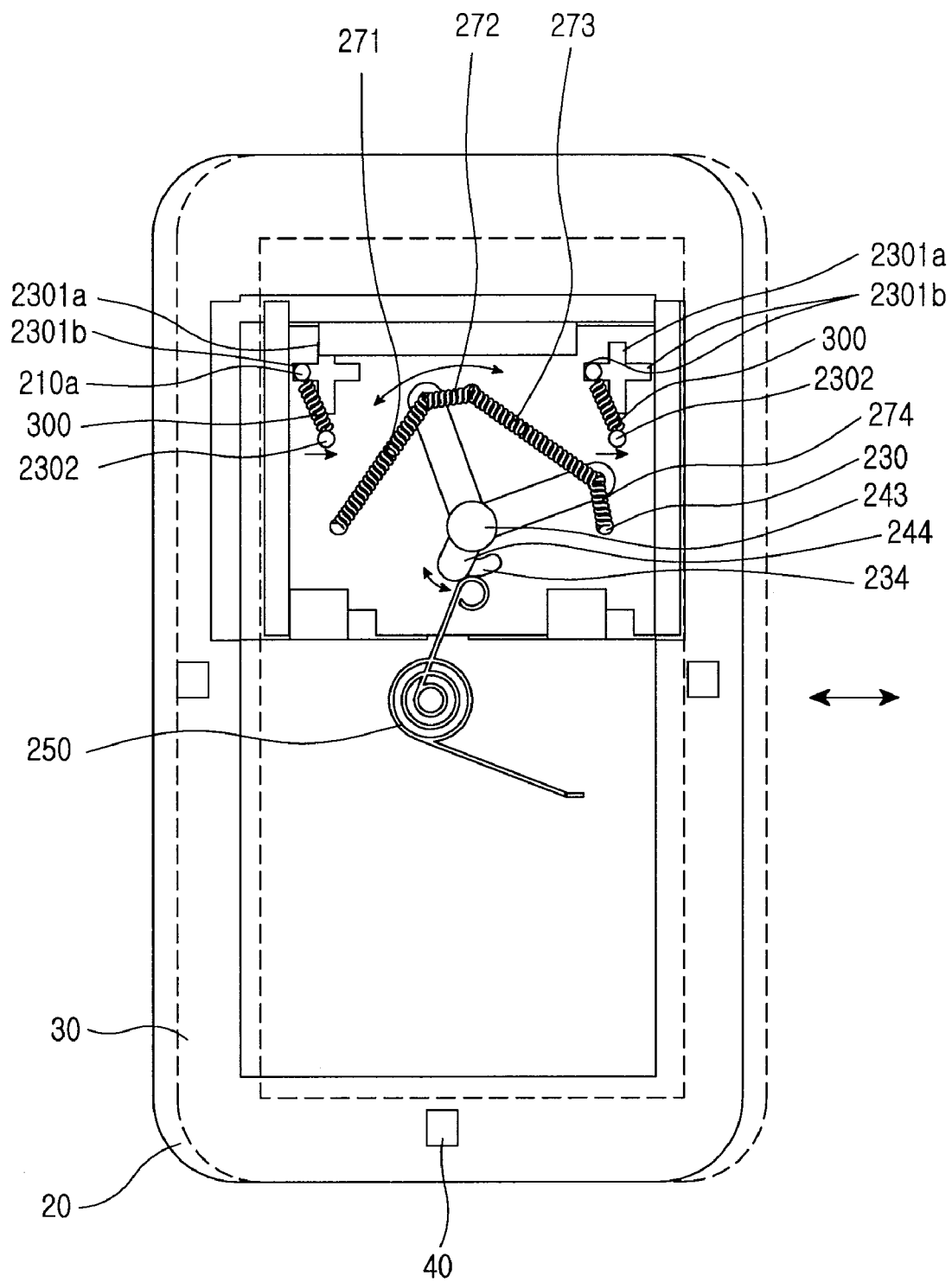
FIG. 40 is a top view of a portable electronic device according to an exemplary embodiment of the present invention when the sliding housing is moved rightward.

As shown in FIGS. 39 and 40, if the user moves the sliding housing 30 away from the main housing 20 in the rightward direction, a motion sensor 40, for example the motion sensor 40 on the right side of the main housing 20, senses the movement, creates a corresponding signal, and applies the signal to the controller (not shown).

Depending on the input signal, the controller enables the user to provide an input to operate the corresponding character key, numeric key, game-dedicated key, volume key, channel switching key, navigation key, control key and the like.

As shown in FIG. 40, when the sliding housing 30 moves in the rightward direction, the first and second sliding members 220 and 230 slide together, and the link member 240 rotates in the rightward direction about the link axis A1.

The first and second fastening protrusions 241 and 242 rotate in the rightward direction, while the guide stopper 244 rotates in the leftward direction, because the guide stopper 244 is formed on an end of the link member 240 lying opposite the ends of the link member 240, on which the first and second fastening protrusions 241 and 242 are formed, respectively, about the coupling hole 243 formed at the center of the link member 240.

The guide stopper 244 limits the rotation as it is guided and moved by the rotation guide unit 234.

As shown in FIG. 40, when the first and second fastening protrusions 241 and 242 rotate in the rightward direction, they extend the first coil spring 271 positioned between the third elastic fastener 236c and the first fastening protrusion 241 and compress the second coil spring 272 positioned between the first fastening protrusion 241 and the fourth elastic fastener 236d. In addition, the third coil spring 273 between the fourth elastic fastener 236d and the second fastening protrusion 242 is extended, while the fourth coil spring 274 between the second fastening protrusion 242 and the fifth elastic fastener 236e is compressed.

When the second sliding member 230 moves in the rightward direction, the elastic fasteners 2302 of the second sliding member 230 move together in the rightward direction and extend the fourth elastic members 300.

At the same time, as shown in FIG. 40, the guide locking units 2301 of the second sliding member 230 move together in the rightward direction, and the second locking units 2301b of the guide locking units 2301 move together to be coupled to the elastic fasteners 210a of the base member 210. The guide locking units 2301 are locked onto the base member 210 and limit the sliding movements of the first and second sliding members 220 and 230 in the upward/downward direction.

If the user releases the sliding housing 30, it returns to its original location on the main housing 20.

The first and second sliding members 220 and 230 also return to their original locations, and the link member 240 rotates about the link axis A1 and returns to its original location.

As shown in FIG. 40, the first and second fastening protrusions 241 and 242 of the link member 240 are rotated from the right to the left by the third elastic members 270, which include the first, second, third, and fourth coil springs 271, 272, 273, and 274. The first coil spring 271 between the third elastic fastener 236c and the first fastening protrusion 241 is compressed again after it has been extended. The second coil spring 272 between the first fastening protrusion 241 and the fourth elastic fastener 236d is extended again after it has been compressed. The third coil spring 273 between the fourth elastic fastener 236d and the second fastening protrusion 242 is compressed again after it has been extended. The fourth coil spring 274 between the second fastening protrusion 242 and the fifth elastic fastener 236e is extended again after it has been compressed.

As shown in FIG. 40, the fourth elastic members 300, which have been extended, are compressed and slide the elastic fasteners 2302 of the second sliding member 230 from the right to the left.

The guide locking units 2301 also move from the right to the left, and the second locking holes 2301b of the guide locking units 2301 disengage from the elastic fasteners 210a of the base member 210 and return to their original locations. As a result, the guide locking units 2301 are unlocked from the base member 210.

As mentioned above, the sliding device of a key input device for a portable electronic device according to an exemplary embodiment of the present invention is advantageous in that the sliding housing equipped with a display unit is adapted to slide in four directions and is used as a key input device instead of the existing direction and navigation keys so that key inputs can be made easily and that the terminal can be compact and slim.

While the invention has been shown and described with reference to certain exemplary embodiments thereof, it will be understood by those skilled in the art that various changes in form and details may be made therein without departing from the spirit and scope of the invention as defined by the appended claims.

For example, the present invention is applicable to every type of portable terminal.

What is claimed is:

1. A portable electronic device, comprising:
a main housing;
a sliding housing coupled to the main housing while being able to slide in upward, downward, leftward, rightward, and diagonal directions on the main housing; and
at least one motion sensor for sensing a movement of the sliding housing, for creating a corresponding signal, and for applying the signal to a controller.

2. The portable electronic device as claimed in claim 1, wherein the movement of the sliding housing provides a corresponding input corresponding to at least one of a character key, a numeric key, a game-dedicated key, a volume key, a channel switching key, a navigation key and a control key depending on the direction of the movement.

3. The portable electronic device as claimed in claim 1, further comprising an elastic member, wherein the elastic member returns the sliding housing to an original location after the sliding housing slides in one of the upward, downward, leftward, and rightward directions on the main housing.

4. A portable electronic device comprising:
a main housing;
a sliding housing coupled to the main housing while being able to slide in upward, downward, leftward, rightward, and diagonal directions on the main housing;
at least one motion sensor for sensing a movement of the sliding housing, for creating a corresponding signal, and for applying the signal to a controller;
a base member;
first and second sliding members coupled to the base member to slide the sliding housing away from the main housing in each direction;
a guide member mounted between the base member and the second sliding member to guide the sliding housing so as to slide away from the main housing in the downward or leftward/rightward direction; and
at least one first elastic member and at least one second elastic member to provide an elastic force necessary to slide the first and second sliding members.

5. The portable electronic device as claimed in claim 4, wherein the base member comprises at least one coupling unit for coupling to a coupling recess on the second sliding member, the coupling unit supporting the second sliding member to slide in each direction.

6. The portable electronic device as claimed in claim 4, wherein the second sliding member comprises a guide unit for guiding the sliding housing to slide away from the main housing in the upward direction.

7. The portable electronic device as claimed in claim 6, wherein the guide unit comprises:

at least one guide rib on a lateral surface of the first sliding member; and
at least one guide rail on a lateral surface of the second sliding member to be coupled to the at least one guide rib while being able to slide, the at least one guide rail for guiding the sliding housing to slide in the upward direction.

8. The portable electronic device as claimed in claim 4, wherein the at least one first elastic member comprises at least one torsion spring positioned between the first and second sliding members to provide an elastic force necessary to slide the first sliding member in the upward direction, a first end of the torsion spring being coupled to the first sliding member, a second end of the torsion being coupled to the second sliding member.

9. The portable electronic device as claimed in claim 4, wherein the at least one second elastic member comprises at least one coil spring positioned between the base member and the second sliding member to provide an elastic force necessary to slide the second sliding member in the downward or leftward/rightward direction, the coil spring having first and second elastic movement units on each end, respectively, to move after the second sliding member in the upward/downward direction and provide an elastic force.

10. The portable electronic device as claimed in claim 9, wherein the guide member comprises:
first and second guide movement holes on the second sliding member;
first and second guide movement members coupled into the first and second guide movement holes while being able to slide, lower surfaces of the first and second guide movement members being coupled to the first and second elastic movement units of the second elastic member, the first and second guide movement members being guided along the first and second guide movement holes to move the first and second elastic movement units in the upward/downward direction when the second sliding member moves; and
first and second guide holes on the base member to be coupled to coupling protrusions on the first and second elastic movement units, the first and second guide holes guiding the first and second elastic movement units to move in the upward/downward direction when the first and second guide members move in the upward/downward direction.

11. The portable electronic device as claimed in claim 10, further comprising latching recesses on central portions of the first and second guide movement holes, respectively, so that the latching recesses contact the first and second guide movement members when the second sliding member is at an initial location and that, when the second sliding member slides in the downward direction, the first and second guide movement holes move together in the downward direction and disengage from the first guide movement member, the second guide movement member moving together while maintaining contact and moving the second elastic movement unit so that the second elastic member is extended/compressed, and slanted guide surfaces are on the first and second guide movement holes so that the slanted guide surfaces face the first and second guide movement members and that, when the second sliding member slides in the leftward/rightward direction, the first and second guide movement members slide in the upward/downward direction, the first and second elastic movement units moving together in the upward/downward direction so that the second elastic member is extended/compressed.

12. A portable electronic device comprising:
a main housing;
a sliding housing coupled to the main housing while being able to slide in upward, downward, leftward, and rightward directions on the main housing;
at least one motion sensor for sensing a movement of the sliding housing in each direction, for creating a corresponding signal, and for applying the signal to a controller inside the main housing;
a base member;
first and second sliding members coupled to the base member to slide the sliding housing away from the main housing in each direction;
a link member rotatably coupled between the first and the second sliding members so that, when the link member rotates about a link shaft, the sliding housing slides in the leftward/rightward direction; and
at least one first elastic member, at least one second elastic member, and at least one third elastic member to provide an elastic force necessary to slide the first and second sliding members.

13. The portable electronic device as claimed in claim 12, wherein the base member is coupled to the main housing, the base member comprises at least one guide protrusion on each of both ends to be coupled to a guide hole on the second sliding member, the guide protrusion for supporting and guiding the second sliding member to slide in each direction, and the base member comprises an elastic fastener fastened to a first end of the second elastic member.

14. The portable electronic device as claimed in claim 13, wherein the second sliding member comprises:
at least one guide hole on the second sliding member and coupled to the guide protrusion on the base member while being able to make a guide movement;
guide units on both lateral surfaces of the second sliding member, respectively, to guide the first sliding member fastened to the sliding housing so that the first sliding member can slide away from the main housing in the upward direction;
a rotation unit inside the second sliding member and rotatably coupled to the link shaft of the link member;
a rotation guide unit adjacent to the rotation unit and coupled to the link member to guide rotation of the link member;
at least one guide member on a lower surface of the second sliding member and adapted to make a guide movement along a guide movement hole on the base member when the first and second sliding members are slid so that the first and second sliding members can slide in the downward direction and leftward/rightward direction; and
at least one elastic fastener on the second sliding member and fastened to a first end of the first, second, and third elastic members.

15. The portable electronic device as claimed in claim 14, wherein the at least one elastic fastener comprises first, second, third, fourth, and fifth elastic fasteners, the first elastic fastener is fastened to the first end of the first elastic member, the second elastic fastener is fastened to the first end of the second elastic member, and the third, fourth, and fifth elastic fasteners are fastened to first ends of the third elastic members.

16. The portable electronic device as claimed in claim 14, wherein the link member comprises a Y-shaped configuration, first and second fastening protrusions are on a first end of the link member and fastened to the third elastic members, a coupling hole on a central portion of the link member to provide the link shaft and to be rotatably coupled to the rotation unit, and a guide stopper on a second end of the link member to be coupled to the rotation guide unit so that rotation of the link member is guided and limited.

17. The portable electronic device as claimed in claim 15, wherein the first elastic member comprises at least one torsion spring positioned between the first and second sliding members to provide an elastic force necessary to slide the first sliding member in the upward direction, wherein the at least one torsion spring comprises a first end fastened to the first sliding member and a second end fastened to the first elastic fastener of the second sliding member.

18. The portable electronic device as claimed in claim 15, wherein the second elastic member comprises a torsion spring positioned on a lower portion of the base member to provide an elastic force necessary to slide the first and second sliding members in the downward and leftward/rightward direction, wherein the torsion spring has a first end fastened to the elastic fastener on the base member and a second end fastened to the second elastic fastener on the second sliding member.

19. The portable electronic device as claimed in claim 15, wherein the third elastic member comprises at least one coil spring positioned on an inner surface of the second sliding member and adapted to be compressed and extended repeatedly to provide an elastic force necessary to slide the first and second sliding members in the leftward/rightward direction, the at least one coil spring comprises first, second, third, and fourth coil springs, the first coil spring comprises a first end fastened to the first end of the third elastic fastener of the second sliding member and a second end fastened to the first fastening protrusion of the link member, the second coil spring comprises a first end fastened to the first fastening protrusion of the link member and a second end fastened to the fourth elastic fastener of the second sliding member, the third coil spring comprises a first end fastened to the fourth elastic fastener and a second end fastened to the second fastening protrusion of the link member, and the fourth coil spring comprises a first end fastened to the second fastening protrusion and a second end fastened to the fifth elastic fastener of the second sliding member.

20. The portable electronic device as claimed in claim 19, wherein the first and second fastening protrusions are positioned between the third, fourth, and fifth elastic fasteners, and the first, second, third, and fourth coil springs are positioned between the third, fourth, and fifth elastic fasteners and the first and second fastening protrusions and adapted to be compressed and extended repeatedly to provide the fastening protrusions with an elastic force when the sliding housing slides in the leftward/rightward direction.

21. The portable electronic device as claimed in claim 12, wherein the main housing has a space hole to accommodate the second elastic member and provide an elastic force.

22. A portable electronic device comprising:
a main housing;
a sliding housing coupled to the main housing while being able to slide in upward, downward, leftward, and rightward directions on the main housing;
at least one motion sensor for sensing a movement of the sliding housing, for creating a corresponding signal, and for applying the signal to a controller;
a base member;
first and second sliding members coupled to the base member to slide the sliding housing away from the main housing in each direction;
a link member rotatably coupled between the first and the second sliding members so that, when the link member rotates about a link shaft, the sliding housing slides in the leftward/rightward direction;

at least one first elastic member and at least one third elastic member to provide an elastic force necessary to slide the first and second sliding members; and at least one fourth elastic member positioned on the second sliding member to provide an additional elastic force necessary to slide the first and second sliding members in each direction.

23. The portable electronic device as claimed in claim 22, wherein the base member comprises at least one elastic fastener fastened to a first end of the fourth elastic member.

24. The portable electronic device as claimed in claim 23, wherein the second sliding member comprises at least one guide locking unit coupled to the elastic fastener of the base member while extending through the elastic fastener so that, when the first and second sliding members slide, the guide locking unit moves together to engage with or disengage from the elastic fastener of the base member and limits movements of the first and second sliding members, and the second sliding member comprises at least one elastic fastener fastened to the first end of the fourth elastic member.

25. The portable electronic device as claimed in claim 24, wherein the guide locking unit has a "+"-shaped configuration.

26. The portable electronic device as claimed in claim 24, wherein the guide locking unit comprises:

a first locking hole adapted to move together when the first and second sliding members slide in the downward direction so that the first locking hole engages with or disengages from the elastic fastener of the base member and limits sliding movements of the first and second sliding members in the leftward/rightward direction; and a second locking hole adjacent to the first locking hole and adapted to move together when the first and second sliding members slide in the leftward/rightward direction so that the second locking hole engages with or disengages from the elastic fastener of the base member and limits sliding movements of the first and second sliding members in the upward/downward direction.

27. The portable electronic device as claimed in claim 24, wherein the fourth elastic member comprises at least one spring for providing an elastic force necessary to move the first and second sliding members in the downward and leftward/rightward directions, and the springs comprise first ends fastened to the elastic fasteners on the base member and second ends fastened to the elastic fasteners on the second sliding members.

* * * * *